(12) United States Patent
Rowe et al.

(10) Patent No.: US 11,327,975 B2
(45) Date of Patent: May 10, 2022

(54) METHODS AND SYSTEMS FOR IMPROVED ENTITY RECOGNITION AND INSIGHTS

(71) Applicant: Experian Health, Inc., Franklin, TN (US)

(72) Inventors: Karly Marie Rowe, Scottsdale, AZ (US); Kenneth Basheer Halaby, Williamstown, NJ (US); John T. Dennis, Marietta, GA (US); Sean Daniel Reisz, Tucker, GA (US); Dimuthu Wijetilleke, Atlanta, GA (US); Christopher Wavil Moody, Rockmart, GA (US)

(73) Assignee: Experian Health, Inc., Franklin, TN (US)

( * ) Notice: Subject to any disclaimer, the term of this patent is extended or adjusted under 35 U.S.C. 154(b) by 460 days.

(21) Appl. No.: 16/370,267

(22) Filed: Mar. 29, 2019

(65) Prior Publication Data

US 2019/0303371 A1    Oct. 3, 2019

Related U.S. Application Data

(60) Provisional application No. 62/650,960, filed on Mar. 30, 2018.

(51) Int. Cl.
*G06F 16/2453* (2019.01)
*G06F 16/2455* (2019.01)
(Continued)

(52) U.S. Cl.
CPC ...... *G06F 16/24564* (2019.01); *G06F 16/248* (2019.01); *G06F 16/2453* (2019.01); *G06F 16/287* (2019.01)

(58) Field of Classification Search
CPC ............ G06F 16/24564; G06F 16/287; G06F 16/2453; G06F 16/248
(Continued)

(56) References Cited

U.S. PATENT DOCUMENTS 8,332,366 B2 * 12/2012 Schumacher ..... G06F 16/24556
                                                   707/688
2010/0175024 A1 * 7/2010 Schumacher ..... G06F 16/24556
                                                   715/810
(Continued)

*Primary Examiner* — Hanh B Thai
(74) *Attorney, Agent, or Firm* — Knobbe, Martens, Olson & Bear, LLP

(57) ABSTRACT

Generating and providing match justifications in association with record matching results for improved record matching is provided. An entity resolution system generates a set of deterministic rules based on patterns of attribute comparison outcomes of known matched and unmatched records. Each rule includes matching conditions and an action instruction including a message of a justification for a match/non-match. The system receives a request to determine a match between two records. A matching engine compares various attributes of the records using probabilistic matching technologies to determine a match outcome. A justification engine compares attribute comparison outcomes to the stored rules. When the matching conditions of a rule are satisfied, the rule is activated and a human-readable justification is linked to the match output and provided in a match response. The justification provides insights into the match outcome, and improves the speed and accuracy of a verification process of the match output.

20 Claims, 12 Drawing Sheets

(51) Int. Cl.
*G06F 16/248* (2019.01)
*G06F 16/28* (2019.01)

(58) Field of Classification Search
USPC .......................................................... 707/713
See application file for complete search history.

(56) References Cited

U.S. PATENT DOCUMENTS

2013/0080192 A1* 3/2013 Bucur ................... G06Q 10/00
 705/3
2017/0053002 A1* 2/2017 Bowman ............... G06F 16/951

* cited by examiner

FIG. 2F

| | PATIENT 1234ABC | PATIENT 9876XYZ |
|---|---|---|
| LAST NAME | White | White |
| FIRST NAME | Ethan | Eytan |
| MIDDLE NAME | B | – |
| SUFFIX | – | – |
| TITLE | Mr. | – |
| DOB | 12-12-1976 | 2-12-1976 |
| SSN | 555-12-3456 | 555-12-3456 |
| STREET ADDRESS | 123 Main St | 123 Main St Apt B5 |
| CITY | Mountain City | Mountain City |
| STATE | XY | XY |
| ZIP | 12345 | 12345 |
| PHONE | 555-123-1234 | 555-123-1234 |

Comparison 1 — MATCH – 98.7
☐ accept & merge  ☐ reject/reverse  ☐ save for later
*mismatched fields are highlighted & need to be resolved*

FIG. 2G

Comparison 1 - MATCH  ☐ accept & merge  ☐ reject/reverse
*mismatched fields are highlighted & need to be resolved*

The FIRST NAME fields are not an exact match, but are a probable match.

PATIENT 1234ABC  PATIENT 9876XYZ
○ Ethan ✎   ◉ Eytan ✎

☑ accept [◉ select the accurate data field if known]
☐ reject – should not be matched
☐ save for later next

210b      215   125

| Comparison 2 | ☐ accept & merge | ☐ reject/reverse | ☐ save for later |
|---|---|---|---|
| NO MATCH 💡 | *mismatched fields are highlighted & need to be resolved | | 214b |
| | PATIENT 1234ABC | PATIENT 9876XYZ | |

```
Based on our analysis, Patient 1234ABC and    ✕
Patient 9876XYZ may be twin siblings.
        -different first names
        -same last names
        -different SSNs
        -same DOBs
        -same addresses
Make a note to verify twin status and update the
records with the "twins" designation to prevent
future matching errors.
```

| STATE | XY | XY |
|---|---|---|
| ZIP | 12345 | 12345 |
| PHONE | 555-123-1234 | 555-123-1234 |

| Comparison 2 | ☐ accept & merge | ☐ reject/reverse | ☐ save for later |
|---|---|---|---|
| NO MATCH 💡 | *mismatched fields are highlighted & need to be resolved | | |
| | PATIENT 1234ABC | PATIENT 5678OHM | |
| LAST NAME | White | White | |
| FIRST NAME ✕ | Ethan | Evan | ⓘ |
| MIDDLE NAME | B | B | |
| SUFFIX | - | - | |
| TITLE | Mr. | - | |
| DOB | 12-12-1976 | 12-12-1976 | |
| SSN ✕ | 555-12-3456 | 555-12-3465 | ⓘ |
| STREET ADDRESS | 123 Main St. | 123 Main St. | |
| CITY | Mountain City | Mountain City | |
| STATE | XY | XY | |
| ZIP | 12345 | 12345 | |
| PHONE | 555-123-1234 | 555-123-1234 | |

METHODS AND SYSTEMS FOR IMPROVED ENTITY RECOGNITION AND INSIGHTS

CROSS REFERENCE TO RELATED APPLICATIONS

This application claims the benefit of U.S. Provisional Application No. 62/650,960, having the title of "Determining Entity Matches" and the filing date of Mar. 30, 2018, which is incorporated herein by reference in its entirety.

BACKGROUND

Record matching technologies are often used to uniquely identify entities. For example, a record matching technology may be used as part of a record linkage system that joins data sets based on entities that may or may not share common information. Such record matching technologies and record linkage systems may be used across a variety of industries and technology areas, such as within healthcare systems to link patient records, law enforcement systems to link criminal records and watch list records, educational systems to link student records, legal/justice systems to link client records, financial systems to link financial records, business systems to link vendor or customer records, and the like. Record matching and record linkage results can provide benefits such as fraud detection, conflicts of interest identification, customer/patient data integration, etc. Based at least in part on a record matching determination (e.g., a match, a non-match), two or more records may be merged (i.e., if the individuals associated with the records are determined to be a match/be a same entity) or not merged (i.e., if the individuals associated with the records are determined to be a non-match/not be the same entity).

In various examples, data exchange is on the uptake, and health data exchange is working toward the goal of interoperability by increasing information sharing across disparate provider organizations using networks and Internet-based technologies. Oftentimes, this data exchanges relies upon demographic information contained in an individual person's record to initially match his/her clinical information amongst multiple provider organizations. Errors in the collection and transcription of demographic data, aging data, and lack of complete data contained within each provider's patient record severely limits interoperability. Oftentimes, record matching technologies use probabilistic matching technologies to resolve an entity, where several field values are compared between two records, each field is assigned a weight that indicates how closely the two field values match, and the sum of the individual field weights indicates the likelihood of a match between the two records (e.g., if the sum meets a predetermined threshold, the two records may be determined as being sufficiently similar enough to be considered as a match). As companies place ever greater value on data and as privacy laws restrict the distribution of certain data, more demand is placed on the accuracy of record linking. For example, if two records are erroneously determined to have matching entities and are merged or linked based on this determination, sensitive data can be inadvertently shared with or accessed by other entities.

Oftentimes, a verification process is implemented as part of record linkage to validate all or a portion of the probabilistic matching outcomes for maximizing accuracy of record linkage. In various examples, a verifier (e.g., administrative worker, data analyst, automated record linkage system) may perform the verification process. Typically, record matching results are provided in the form of binary answers that indicate whether an entity associated with one record is a match with an entity associated with another record (e.g., yes or no, match or no-match). However, such record matching results do not include a justification for the determination or insights into how the match determination was made.

An inefficiency associated with a record matching result provided without a match justification can include in inefficiency of the verification process, where the verifier may be burdened with reviewing various data elements of two records associated with a record matching result to try to ascertain why the two records were determined to have a matching or non-matching entity. For example, when a verifier receives a match result without a justification, the verifier is not provided with useful information that can allow the verifier to focus on the specific data fields on which a particular outcome/result (e.g., match or no-match) is based. That is, a technical problem associated with record linkage is the inefficiency of a verification process due at least in part to a lack of match justification data that, if provided, can improve the speed and accuracy of validating record matching outcomes. Further, without match justification data, the verification process can be susceptible to inaccurate verifications of record match outcomes due to human error, which can produce inaccurate or unresolved record linkage results. Inefficiencies associated with inaccurate or unresolved record linkage results can include, but are not limited to increased bandwidth use (e.g., for repeated requestor authentication, inefficient/inconclusive record searches, duplicated result transmissions, over-sharing of data) and decreased data security (e.g., over-collection of data, storing multiple instances of a record, additional parties having access to data).

SUMMARY

Aspects of the present disclosure provide a technical improvement to record matching by providing match justifications in association with record matching results. An entity resolution system described herein provides improvements to the speed and accuracy of record linkages and improvements to the security of said records among other benefits that will be recognized by those of ordinary skill in the art upon reading the specification. In example aspects, the entity resolution system includes a rule learner that generates and stores a set of deterministic rules based on identified attribute patterns corresponding to attribute comparison outcomes of known matched and unmatched data records. Each deterministic rule includes a set of matching conditions representing an identified attribute pattern and an action instruction that the rule executes when the matching conditions are satisfied. According to aspects, the action instruction includes a human-readable message that provides a justification associated with why two data records match or do not match (e.g., matching attributes, differential attributes, predetermined scenarios corresponding to the attribute comparison outcomes).

The entity resolution system is configured to receive requests from a requestor system to determine whether an entity described by various attributes of a first data record and an entity described by various attributes of a second data record are the same entity or different entities. In example aspects, a matching engine of the entity resolution system compares the various attributes of the data records using probabilistic matching technologies to determine attribute comparison outcomes for each compared attribute and an overall match outcome for the data record comparison. A justification engine of the entity resolution system compares the attribute comparison outcomes to the stored deterministic rules. When the matching conditions of a deterministic rule are satisfied, the rule is activated and the assigned action of the rule is executed. When the rule is executed, the human-readable justification is linked to the match output and provided to the requestor in a match response.

By providing human-readable insights into record matching outcomes, the speed and accuracy of verification process for validating record matching outcomes is improved. For example, the justification provided with the match output provides information to the verifier in a human-readable and easily-consumable format. The justification enables a verifier to focus on the specific attributes on which a particular outcome/result (e.g., match or no-match) is based rather than having to manually review and compare all the attributes for the data records. As can be appreciated, the justification can increase the speed of verifications and reduce erroneously linked/un-linked data records, which can result in negative health outcomes, serious privacy breaches, and legal ramifications.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

Further features, aspects, and advantages of the invention represented by the examples described in the present disclosure will become better understood by reference to the following detailed description, appended claims, and accompanying figures, wherein elements are not to scale so as to more clearly show the details, wherein like reference numbers indicate like elements throughout the several views, and wherein:

FIG. 2F is an illustration of an example user interface displaying a match comparison result including an example match justification, where differential data attributes are highlighted;

FIG. 2G is an illustration of an example user interface that enables an administrative user to resolve a mismatched data attribute;

FIG. 2H is an illustration of an example user interface that includes a match justification for a match comparison outcome and a listing of attributes that are associated with matching conditions of a rule linked to the justification;

FIG. 2I is an illustration of an example user interface displaying a match comparison result including an example match justification, where a data attribute that needs to be resolved is highlighted;

DETAILED DESCRIPTION

Aspects of methods and systems for providing match justifications in association with record matching results for increased speed and accuracy of record linkages based on the record matching results and improvements to the security of the records among other benefits. According to examples, a request for determining a match is received (e.g., a request to determine whether an entity associated with a first record is the same entity associated with a second record). The request may comprise the first record and the second record, and data from fields of the records are extracted and compared. The comparison can be a one-to-one comparison for each of the fields of the records or of preselected fields to determine a similarity. An outcome of the match is determined from the determined similarity. A justification for the outcome is determined based on a set of deterministic rules, and the outcome and the justification for the outcome is provided as a response to the request. According to an aspect, the outcome and the justification for the outcome can be utilized by the requestor as part of making a determination as to whether to link the two records, wherein the justification provides insights into the match outcome in a human-readable and easily-consumable format.

In example aspects, the set of deterministic rules is created prior to the comparison, for example, based on stored historical or empirical data. The deterministic rules are determined by comparing various fields of known matched records of the historical data and learning patterns between matches of different combinations of fields and known record matching outcomes (e.g., that two records match and are associated with a single entity, that two records match to a point that they are associated with related entities, that two records do not match and are associated with two separate entities). The deterministic rules are based on these learned patterns and include different combinations and values of matches or no-matches of data corresponding to the various combinations of fields. Each of the matching patterns is assigned a rule and is stored in a database or a table for use in determining and providing match justifications for match outcomes.

Figure 1:
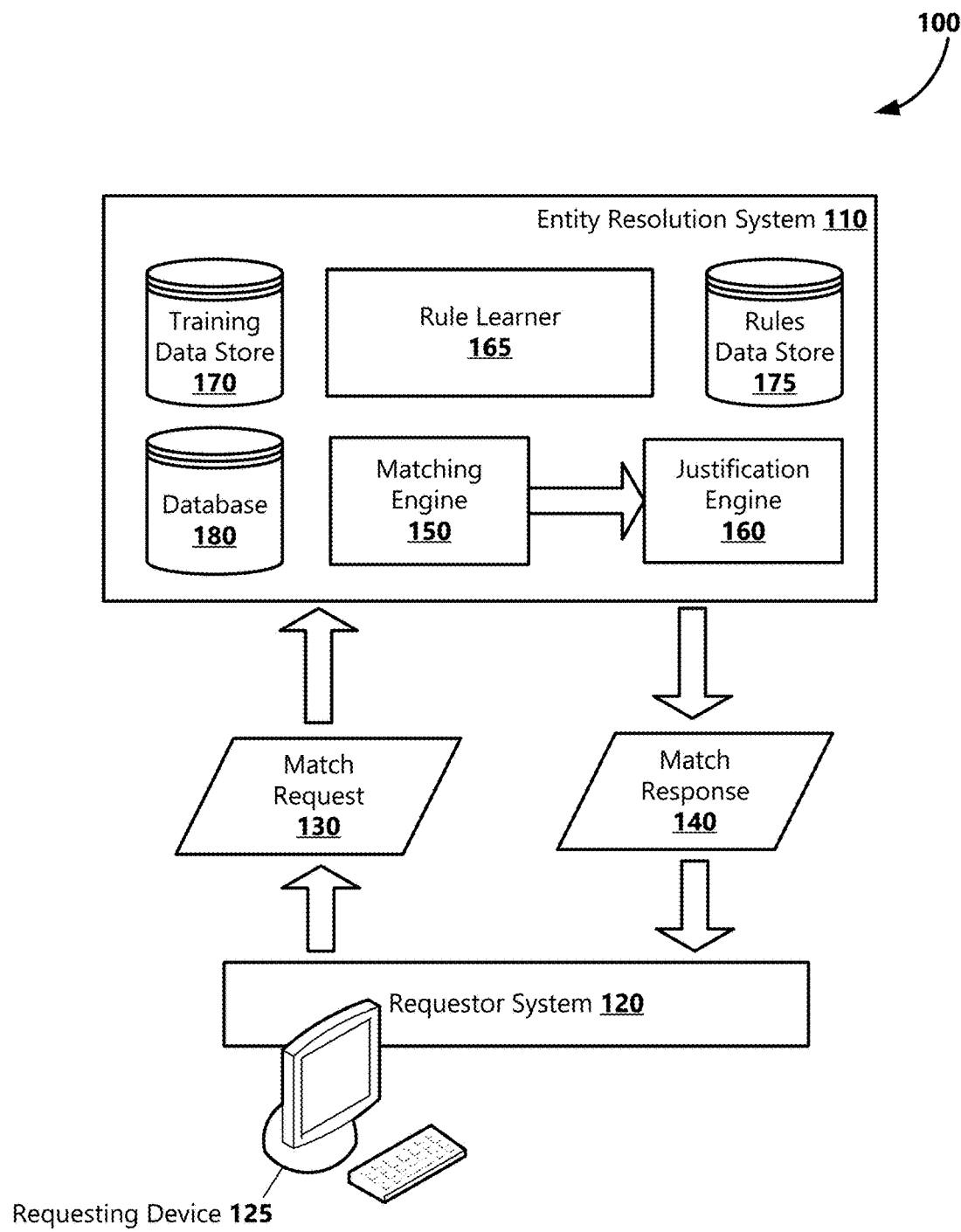
FIG. 1 is a block diagram illustrating an example operating environment in which an entity resolution system can be implemented for determining and providing a match justification for a match outcome.

FIG. 1 illustrates an example operating environment 100 for providing match justifications in association with record matching results (outcomes) in accordance with an embodiment. The example operating environment 100 includes an entity resolution system 110 and a requestor system 120. According to an aspect, the entity resolution system 110 communicates with the requestor system 120 to provide a match response 140 in response to a match request 130 sent by the requestor system, wherein the match response includes a match outcome and a justification for the outcome.

Figure 5A:
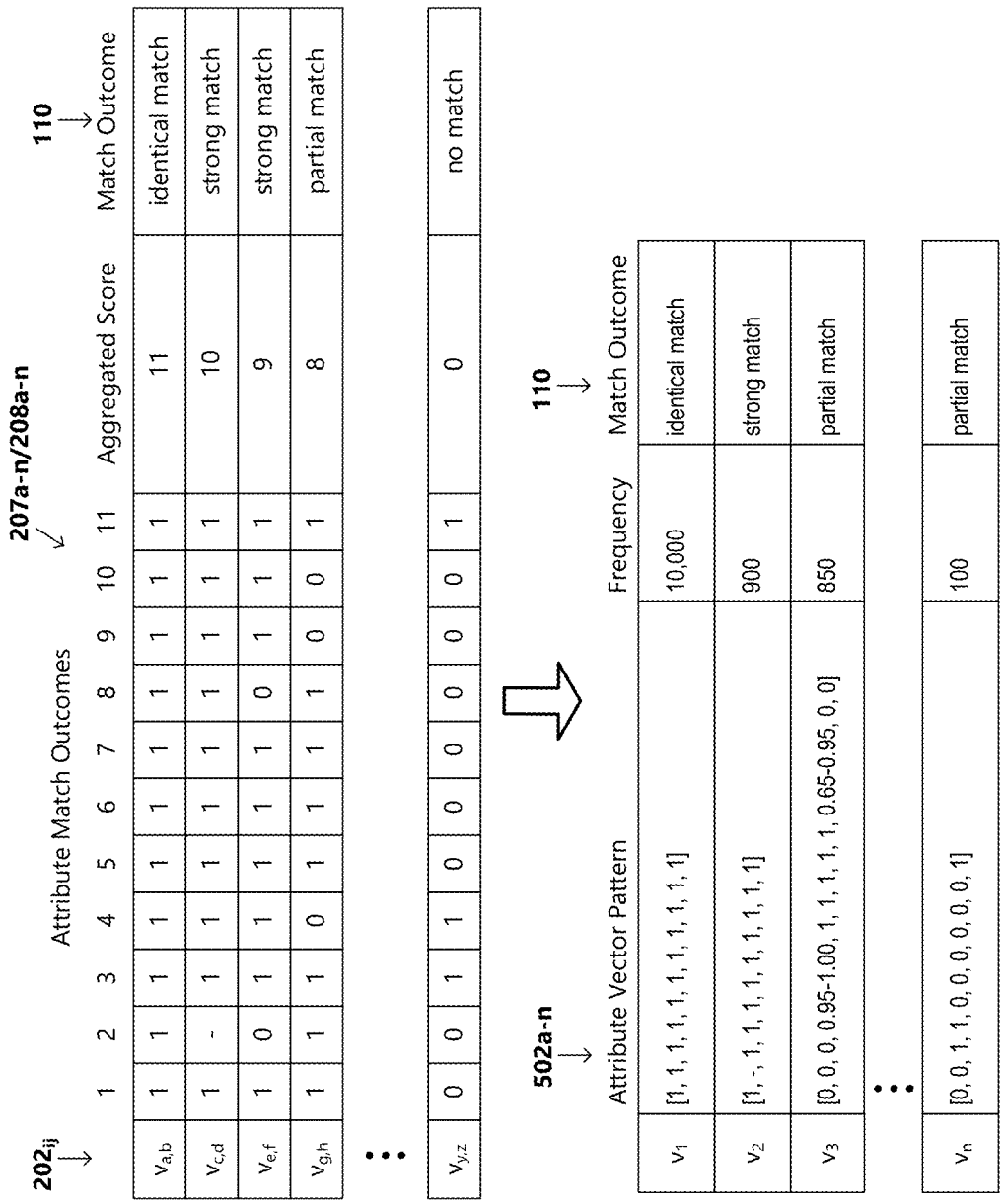
FIG. 5A is a table illustrating examples of probabilistic match outcomes.
Figure 5B:
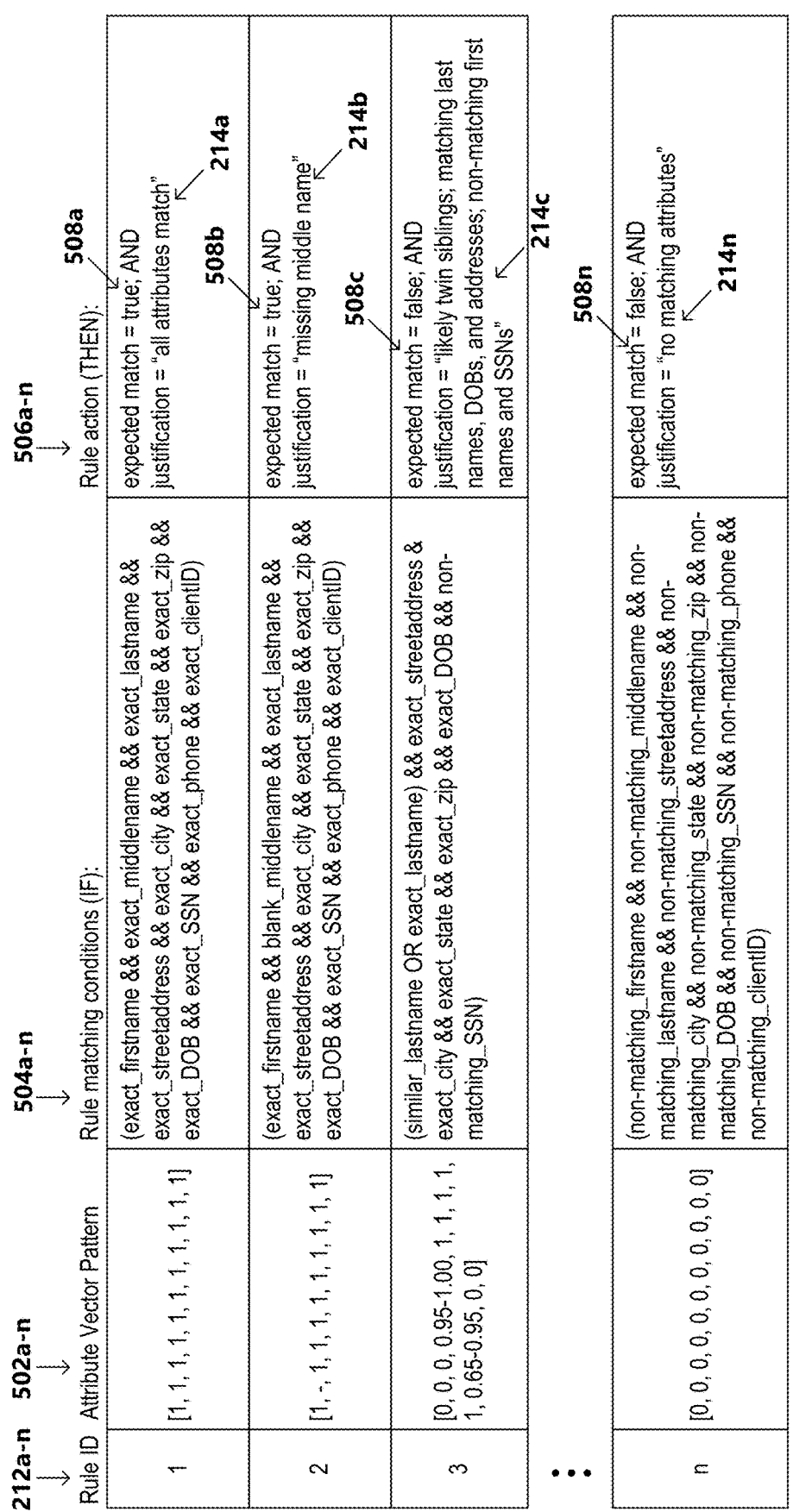
FIG. 5B is a table illustrating example deterministic rules.

The entity resolution system 110 and requestor system 120 are illustrative of a wide variety of computing devices, the hardware of which is discussed in greater detail in regard to FIG. 5. The computing devices may include, but are not limited to: servers, desktop computers, laptops computers, tablets, smart phones, personal digital assistants, and distributed systems that are run on multiple computing devices. In various aspects, the entity resolution system 110 and the requestor system 120 communicate with one another via the Internet, a private network, or a virtual private network or tunnel over a public network, which may include wired and wireless components to link systems that are located remotely from each other.

In various examples, the requestor system 120 is located at a service provider, such as a healthcare service provider. In other examples, the requestor system 120 is located at a provider of services in another industry or technology area (e.g., law enforcement, educational system, legal/justice system, financial system, business system). In an example aspect, entity resolution system 110 is remote from the requestor system 120. That is, the entity resolution system 110 is implemented in a computing environment that is remote to the computing environment in which the requestor system 120 is operated. In some aspects, entity resolution system 110 is a cloud based service. The requestor system 120 may employ use of the entity resolution system 110 for entity resolution as part of a record linkage process, wherein data records may be linked or joined based on a match response 140 provided by the entity resolution system. For example, if the requestor system 120 is associated with a healthcare provider system, the healthcare provider may send a request to the entity resolution system 110 to determine whether an individual associated with a particular patient record is the same individual associated with another patient record for making a determination as to whether to merge or not to merge the patient records. The patient records may originate from a same originating database or from different originating databases, and the record linking determination may be part of a decision for linking electronic records across clinical and administrative systems. As can be appreciated, accurate patient identification is foundational to the successful linking of patient records within care delivery sites and across the healthcare ecosystem, and failure to accurately resolve entities and link records can result in erroneously overlaid (i.e., joined or linked) or disconnected medical records and subsequently negative health outcomes, serious privacy breaches, and legal ramifications.

The requestor system 120 includes at least one requesting device 125 that is configured to send a match request 130 to and receive a match response 140 from the entity resolution system 110. In various implements, the requesting device 125 represents the computing device of a requesting user, who is tasked with reviewing the match response 140 and determining whether to link two records based on the response. In various aspects, the requesting device 125 runs a specific program to access the entity resolution system 110, but may also access the entity resolution system 110 via an Application Program Interface (API) or via a thin-client that is configured to request and return the match request 130 and match response 140 via a web browser. A match request 130 may be sent to the entity resolution system 110 as an individual request, as batches, as records associated with one individual, as records associated with multiple individuals, etc.

According to an aspect, the requestor system 120 creates a match request 130 including at least one data record and sends the match request to the entity resolution system 110, wherein the at least one data record includes demographic data that are used to identify a specific person in that record. For example, demographic data may include, but are not limited to: names, titles, addresses, related parties, entity providing the data record/service to which the data record is associated, date of birth, and identifiers included in the data record (e.g., a social security number, a customer loyalty number, a bank account). In various examples, a data record is created when demographic details are entered into the requestor system 120, such as when an entity (e.g., patient) visits the requestor (e.g., healthcare provider) to receive healthcare services and provides his/her demographic information to an administrative worker or input interface. In various examples, a data record includes information that allows a healthcare provider to determine a patient's medical history and to provide informed care. For example, in addition to the demographic data, a data record can include such information as admission notes, on-service notes, progress notes, pre-operative notes, post-operative notes, procedure notes, delivery notes, postpartum notes, discharge notes, etc.

The entity resolution system 110 is configured to receive the match request 130 and analyze the demographic data included in the at least one data record to identify the person described in that data record. In some examples, the match request 130 includes a first data record associated with a first entity (e.g., patient) and data records associated with one or more candidate entities. For example, the requestor system 120 may identify and provide, in the match request 130, one or more candidate data records to compare against the first data record for determining whether the first entity is a match with the one or more candidate entities.

In other examples, the match request includes a first data record associated with a first entity, and the entity resolution system 110 is configured to identify one or more candidates based on common information (e.g., common names, common addresses, common SSNs) or a combination of shared common information. In various implementations, the matching engine 150 is configured to use a matching algorithm to search a database 180 that stores data records associated with a plurality of entities (e.g., patients) for one or more candidates. For example, the database 180 may store thousands or millions of data records, and the matching algorithm can reduce the number of comparisons to be performed by a matching engine 150 of the entity resolution system 110 to a smaller sampling of candidates. In some aspects, the database 180 is subsystem of the entity resolution system 110, while in other aspects, the database is an externally-managed demographic database. In some aspects, the database 180 is a UID (unique identifier) database that is a subsystem of the entity resolution system 110, while in other aspects, the database 180 is an externally-managed UID database. In various examples, the database 180 includes a centralized index of patients collected from a plurality of healthcare providers, and the entity resolution system 110 is configured to search the index to find patients/candidates that satisfy search criteria (e.g., a matching/similar names, matching/similar addresses, matching/similar SSNs). In some examples, the database 180 provides an API for enabling searching and querying the index to find candidates.

As mentioned above, the entity resolution system 110 includes a matching engine 150. The matching engine 150 is illustrative of one or more software applications, modules, or computing devices operative or configured to determine a match between records (e.g., a particular data record and one or more candidate data records). In various examples, the matching engine 150 is configured to use exact matching and deterministic algorithms as matching tools. For example, with exact matching, the matching engine 150 is operable to find exact matches between compared demographic fields data. In various examples, the matching engine 150 is configured to use deterministic matching, in addition to exact matches, to identify partial matches or matches on phonetic codes to identify matches. For example, using exact matching, if the last name "Doe" is compared against the last name "Doee," the "Doee" record may not be determined as a match, as it does not match exactly. However, a deterministic match may be determined between "Doe" and "Doee" using a substring/partial name match.

In some examples, the matching engine 150 is configured to use more advanced techniques to compare records. For example, fuzzy logic and arbitrary or subjective scoring can be used to enhance exact match and deterministic tools, wherein a field match weight is assigned to preselected patient identifying attributes (i.e., demographic fields), such as last name, first name, date of birth, SSN, and address. For example, a certain score or multiplier may be applied to a match on a SSN demographic field, while a match of a last name demographic field may be assigned a different score or multiplier (e.g., which may be higher or lower than the SSN demographic field multiplier). The field match weight may be based on historical data, such as learned values of particular matched attributes/fields in association with a known matched record. A match may be determined between records that satisfy a minimum scoring threshold. For example, similarity scores between attributes and a collective attribute similarity score are numerical values, and the magnitude of these values indicates the degree of a match and signifies the likelihood that any two entities are the same. The higher the score is, the higher the likelihood that the two entities are the same.

In some examples, fuzzy logic and rules-based algorithms can further include nickname tables, rules to address transposition of characters or names, digit rotations, and typographical errors within records (e.g., a match may be determined between an "Elizabeth Jones" and a "Liz Jones" or between a "David Norman" and a "Norman David"). In some examples, the matching engine 150 may further include an automated frequency adjustment, which decreases a field match score if a data field value is determined to be present in a large number of other records (e.g., a matching DOB of Jan. 1, 2001).

In some examples, the matching engine 150 is configured to use advanced algorithms that use intelligence based on mathematical theory for matching records. For example, using advanced matching techniques, the matching engine 150 may use one or more of bipartite graph theory, probabilistic theory, and mathematical and statistical models, which are applied to determine the likelihood of a match on specified data fields. According to an aspect, using probabilistic matching, the matching engine 150 is operable to use the frequency of a specific attribute (field data) with a probability score assigned to adjust the relative value of the match or mismatch for the specified attributes. The weight assigned to each field may be relative to the weights assigned to other fields, but based on an analysis of millions of records (as opposed to a simple frequency analysis with an arbitrary field weight adjustment). For example, a comparison between a data record including the following demographic information: Susan Ann Smith, DOB Jan. 13, 1987, SSN 555-11-1234, 123 Broadway may be determined as a match with a data recording including the following demographic information: Suzanne Smith, DOB Jan. 18, 1978, SSN 555-12-1234, 123 Broadway Apt A1, despite a variance in multiple demographic data fields.

Figure 2A:
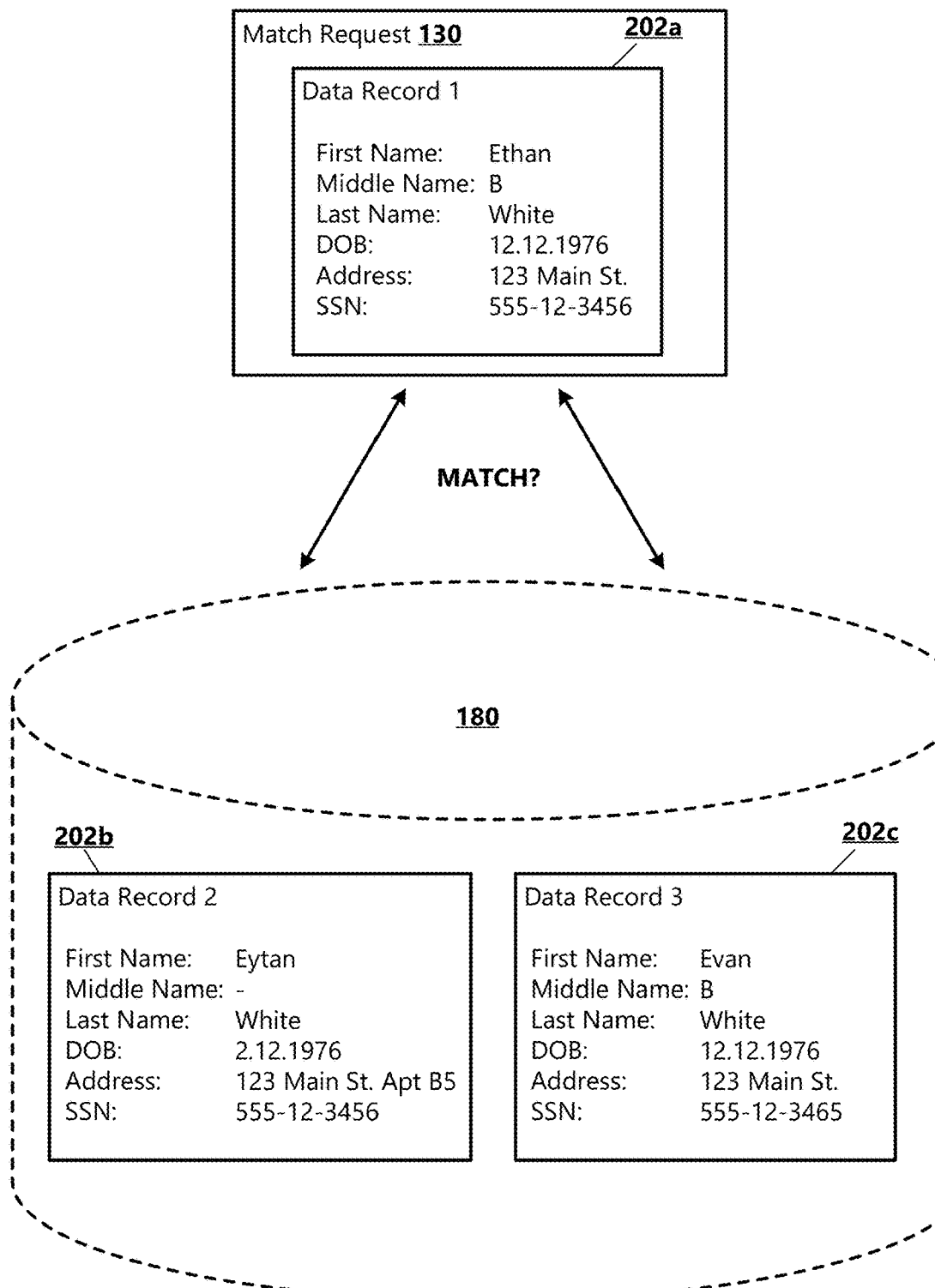
FIG. 2A is a block diagram illustrating an example match request directed to the entity resolution system for determining a match between a first data record and two candidate data records.
Figure 2B:
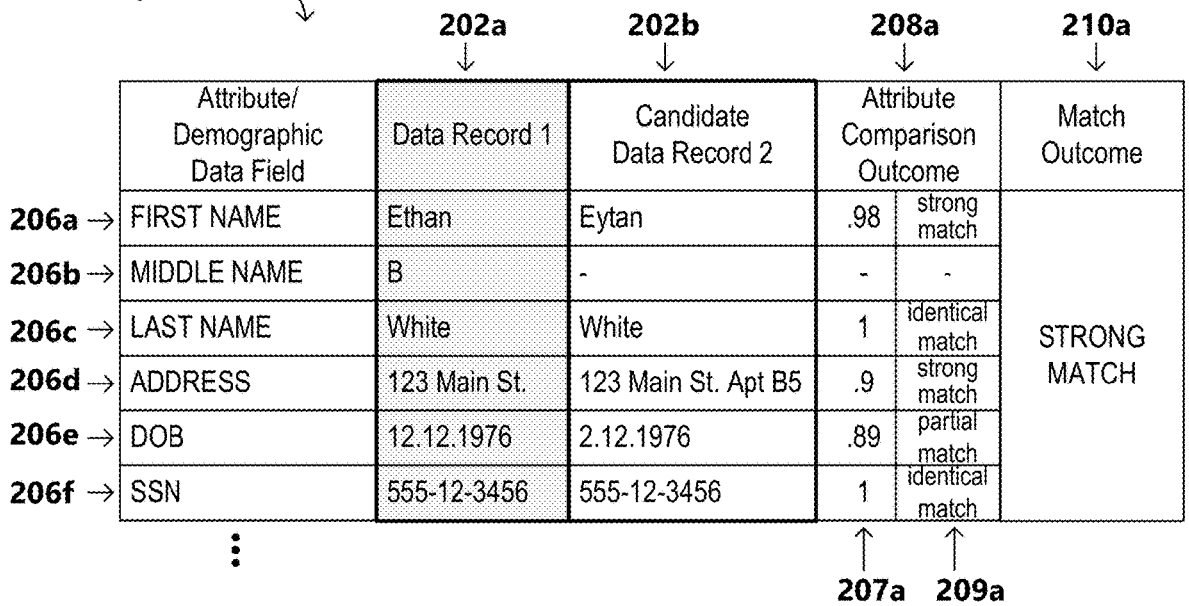
FIG. 2B is a table illustrating a first example data record comparison between the first data record and the first candidate data record.
Figure 2C:
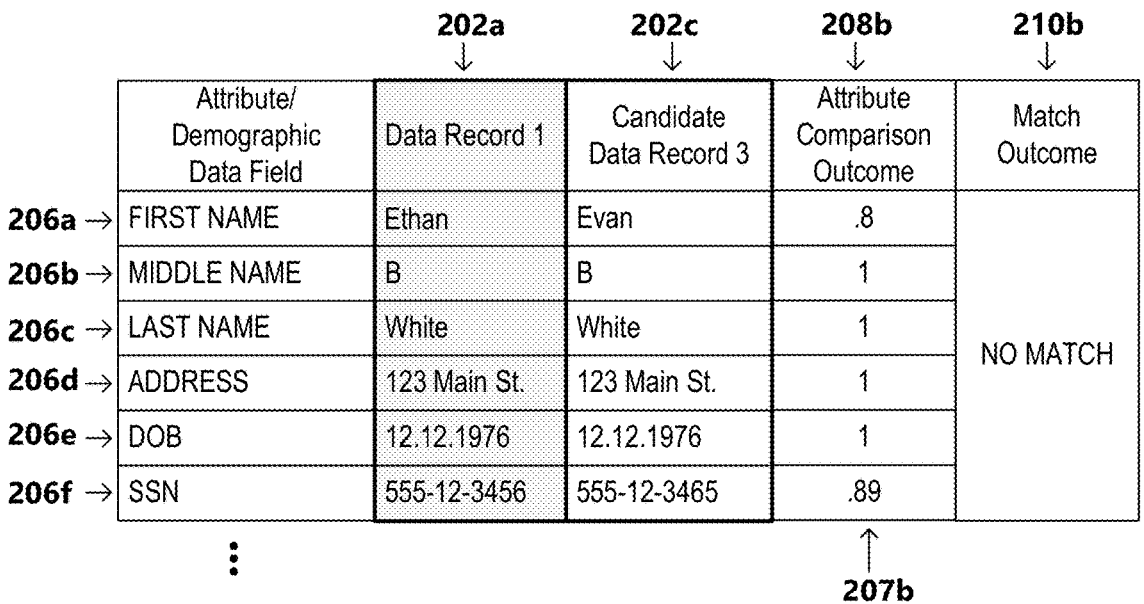
FIG. 2C is a table illustrating a second example data record comparison between the first data record and the second candidate data record.

According to an example and as illustrated in FIGS. 2A-2C, example comparisons between data records 202*a-n* (generally 202) are shown. With reference now to FIG. 2A, three example data records 202*a-c* are illustrated: a first data record 202*a* and two candidate data records 202*b,c*. For example, a requestor system 120 may send a match request 130 to the entity resolution system 110 to determine whether a first entity (e.g., patient, student, client) associated with the first data record 202*a* matches an entity associated with another data record (e.g., candidate data record 2 202*b* and candidate data record 3 202*c*). In some examples, the candidate data records 202*b,c* are included in the match request 130. For example, the requestor system 120 may identify one or more candidate data records to compare against the first data record 202*a*, and may include the first data record 202*a* and the candidate data records 202*b,c* in the match request 130. In other examples, the match request 130 includes the first data record 202*a*, but does not include candidate data records 202*b,c*. For example, the candidate data records 202*b,c* may be stored in a data record database 180 and identified as candidates by the matching engine 150 based on a search or query on the database. In some examples, the match request 130 includes unique identification numbers (UINs) of the data records 202 to match, and the matching engine 150 retrieves the data records from the database 180 (e.g., index) using the UINs.

With reference now to FIG. 2B, a first comparison 225*a* is shown, wherein the first comparison is a comparison between various attributes 206*a-n* (generally 206) of the first data record 202*a* and the second data record (candidate data record 2 202*b*). In the illustrated example, the attributes 206, which may sometimes be referred to herein as attribute fields, are demographic data fields that include demographic data describing an entity associated with the data record 202. In some implementations, the matching engine 150 is configured to extract attribute 206 data from the data records 202*a,b* and to compare the attribute data for similarity according to one or more of the matching methods described above. In some examples, the matching engine 150 is configured to extract and perform a one-on-one comparison of attribute data corresponding to preselected attributes 206, such as a comparison of a first name demographic field (first name attribute 206*a*), a last name demographic field (last name attribute 206*c*), a middle name/initial demographic field (middle name/initial attribute 206*b*), a DOB demographic field (DOB attribute 206*e*), a SSN demographic field (SSN attribute 206*f*), and a street address demographic field (street address attribute 206*d*). Other demographic data comparisons are possible and are within the scope of the present disclosure. In the example, the attributes 206 to be compared may be determined empirically and/or heuristically, where comparison of certain attribute fields are performed if the comparison increases the accuracy of the match outcome 210a.

For each of the attribute 206 comparisons, the matching engine 150 is configured to determine an attribute field match outcome (herein referred to as an attribute comparison outcome 208). As illustrated in FIG. 2B, the first name attribute 206a of the first data record 202a, which includes the example first name demographic data "Ethan," and the first name demographic attribute 206a of the candidate data record 2 202b, which includes the example first name demographic data "Eytan," are compared by the matching engine 150 and the likelihood of a match (attribute comparison score) on the first name attributes 206a is determined. In the illustrated example, the outcome of the comparison (i.e., attribute comparison outcome 208a) is provided as an attribute comparison score (e.g., 0.98) on a preselected scale based on the level of the match, such as between minus one and plus one (−1 to +1), where minus one is assigned for a non-match and plus one is assigned for an exact match. In this example, the matching engine 150 may use probabilistic matching to determine the attribute comparison outcome 208 by determining a similarity score for the first name demographic fields 206a,b using one of various approximate scoring methods and then applying a predetermined weight to the similarity score. For example, the weight can be predetermined based on a learned degree of effect that a match of a particular attribute or a particular combination of attribute has on a match outcome.

In some examples, the attribute comparison outcome 208 includes a calculated attribute comparison score 207. In other examples, the attribute comparison outcome 208 includes a binary outcome or result 209 based on the calculated attribute comparison score that indicates whether the data in the compared attribute fields 206 match or do not match, or whether an attribute field is blank (e.g., yes, no, -; match, non-match, -). For example, the matching engine 150 may compare the (weighted or unweighted) similarity score (i.e., attribute comparison score 207) against a predetermined threshold. If the attribute comparison score 207 satisfies the predetermined threshold, the attribute fields 206 being compared may be determined as a match, and the attribute comparison outcome 208 may include an attribute comparison result 209 recorded as a binary answer, such as "match," "yes," or other match designator. In other examples, the attribute comparison outcome 208 includes a result 209 that indicates a degree or level of match (e.g., identical match, strong match, partial match) based on the calculated attribute comparison score. If the attribute similarity score (attribute comparison score 207) does not satisfy the predetermined threshold, the demographic data fields may be determined to not match, and the attribute comparison result 209/attribute comparison outcome 208 may be recorded as a binary answer, such as "not a match," "no," or other non-match designator. If data of an attribute field 206 is missing or blank in a particular data record 202, the attribute comparison outcome 208 may be blank or may be recorded as a "-" or other blank designator. Or, in some examples, a predetermined similarity score (attribute comparison score 207) is assigned for a comparison involving one or more missing attribute 206 data. In example aspects, different similarity scores (attribute comparison scores 207) are assigned when attribute 206 data is missing in only one of the records 202a,b and when the attribute data is missing in both the records.

With reference to the example comparison 225a in FIG. 2B, the matching engine 150 is configured to match each of the demographic data fields (attributes 206) or each of a preselected set of demographic data fields (attributes 206a-f) of the two data records 202a,b, and to determine a (weighted or unweighted) similarity score (attribute comparison score 207a) for each demographic data field. Further, based on the comparisons, the matching engine 150 determines an overall similarity score and a match outcome 210a of the match request 130. In various examples, the overall similarity score is the sum of the weighted similarity scores (attribute comparison scores 207a). An example match outcome 210a includes that two records 202a,b match or the two records do not match. In some examples, the match outcome 210a includes the overall similarity score. In other examples, record pairs whose overall similarity score meets or exceeds a predetermined match threshold are deemed to be matches, and the match outcome 210a may be an indication of the match (e.g., "match," "yes," "same entity"). In other examples, the match outcome 210a includes an indication of a level/strength of the match (e.g., "identical match," "strong match," "partial match") based on the overall similarity score and predetermined match thresholds associated with various levels or strengths of matches. Accordingly, record pairs whose overall similarity score is below a non-match threshold are deemed to be non-matches, and the match outcome 210a may be an indication of the non-match (e.g., "non-match," "no," "no match," "not a match," "different entities"). FIG. 2C shows an example second comparison 225b between various demographic data fields (attributes 206) of the first data record 202a and the third data record (candidate data record 3 202c), wherein the match outcome 210b of the second comparison 225b is determined to be a non-match.

According to aspects, when matching tools (e.g., the matching engine 150) are used to resolve entities and to link data records 202, to ensure that only true overlap data records (i.e., data records describing the same entity) are linked, the results (or at least a statistically significant sample of the results) may be verified by staff using various record-matching validity procedures. Oftentimes, even when advanced matching techniques are used, the requestor system 120 will likely achieve higher rates of data record 202 links if candidate data records 202b,c that have an overall similarity score lower than the predetermined threshold are reviewed and manually linked. Further, there may be potential intra-facility duplicate pairs, and a match response 140 may be sent to the participating organization (requestor system 120) for staff to review, validate, and manually combine. For example, false positives and false negatives may occur with any algorithmic or manual system (e.g., the matching engine 150) that identifies potential matches. A false negative may result when the matching engine 150 does not identify a true match and the matching data records 202 remain in the database. False positives may occur when two data records 202 are matched together because they are presumed to belong to one person, when in fact they belong to different people. Linkages due to false positives or false negatives may be reduced if a review/validation process is performed. As can be appreciated, a failure to catch such errors can result in overlaid medical records (data records 202) and subsequently negative health outcomes, serious privacy breaches, and legal ramifications.

Figure 2D:
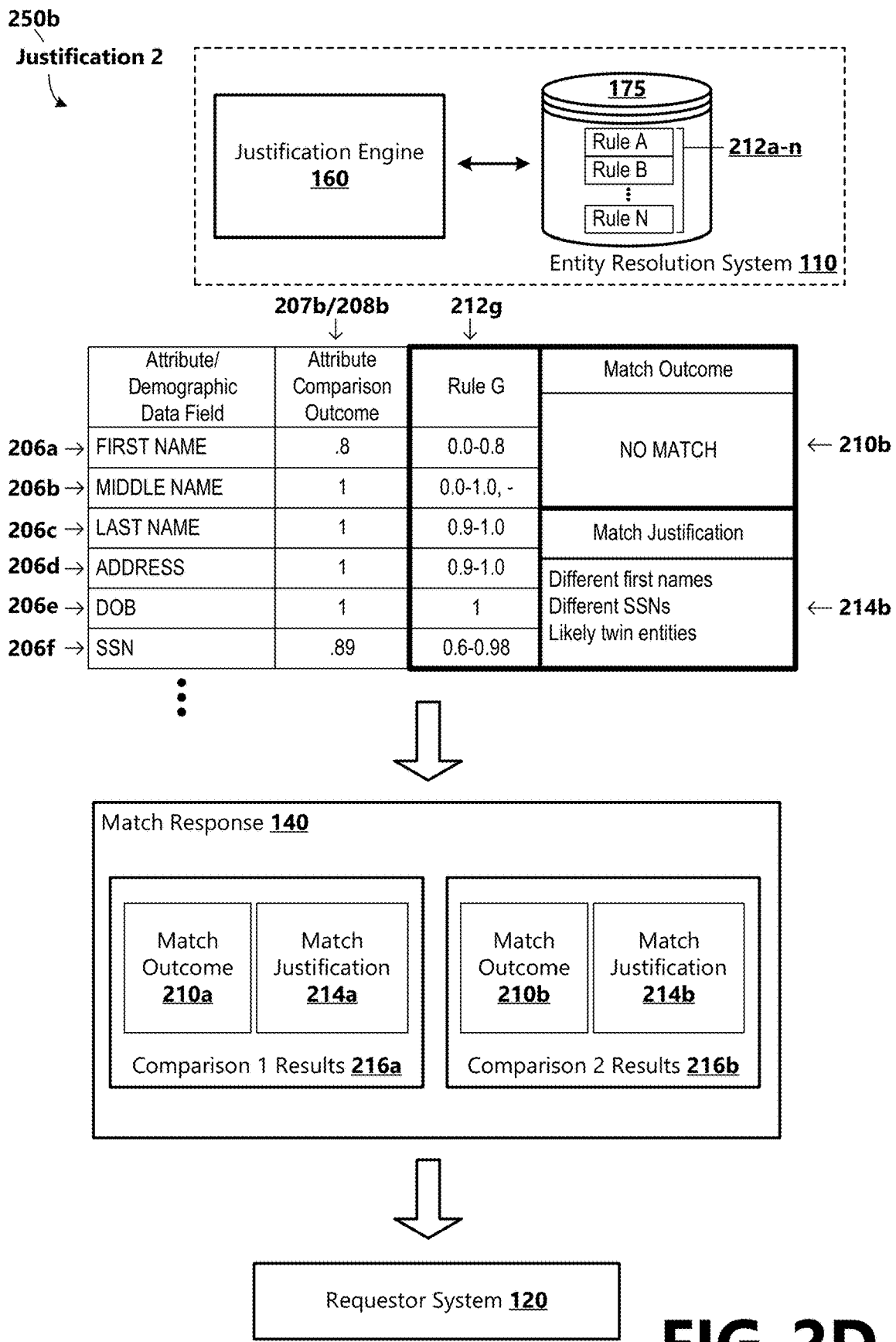
FIG. 2D is a block diagram illustrating an example match justification as part of a match response directed to a requestor system.

A technical solution to improve data record 202 linkage results includes providing matching feedback or justifications for match outcomes 210 in a human-readable and easily-consumable format. According to an aspect and with reference now to FIG. 2D, the entity resolution system 110 includes a justification engine 160 illustrative of one or more software applications, modules, or computing devices operative or configured to determine and output match justifications 214a-n (generally 214) for match outcomes 210. According to an aspect, the justification engine 160 is configured to perform a lookup operation in a rules data store 175 to determine a rule 212 that applies to the comparison 225 for determining the match justification 214. In example aspects, the set of deterministic rules 212 is created prior to the comparison, for example, based on training data comprising collected and stored historical or empirical data. For example, the historical/empirical data may be collected and stored in a training data store 170, and may include known matched/separate/related entities and known matched/unmatched data records 202.

According to an aspect, a rule learner 165 component of the entity resolution system 110 analyzes the training data, identifies various patterns of attribute comparison outcomes 208 corresponding to actual results (e.g., verified entity resolution (match/non-match) results, verified data record 202 links), and creates or determines a deterministic rule 212 for each learned pattern. The learned patterns can include different combinations and values of matches or non-matches of data corresponding to various combinations of attributes 206 (e.g., demographic data fields) in association with known actual results (e.g., verified matching/non-matching data records 202). According to an aspect, a deterministic rule 212 includes a set of match conditions that represent a learned combination of attribute comparison outcomes 208. For example, when data records 202 are analyzed for determining a match outcome 210, if these match conditions of the deterministic rule 212 are satisfied, then the justification 214 associated with the rule is linked to the match outcome 210.

In some examples, a deterministic rule 212 includes a justification or reason code as to why two data records 202 match or do not match (e.g., exact name match, probable name match, different SSNs, matched from reference data). In some examples, a deterministic rule 212 includes differential attributes 206 (e.g., no match on record 123 Maria Garcia and record 456 Mario Lopez; no match justification: different names). In example aspects, the rule learner 165 analyzes, learns, and ranks the deterministic rules 212 in order based on best matching/highest-possible overall similarity scores to lesser-confident matches/lower overall similarity scores. For example, a first rule 212a may include matching conditions representing a first combination/pattern of match/non-match/blank attribute comparison outcomes 208, wherein the first combination of attribute comparison outcomes totals a higher possible overall similarity score than the possible overall similarity score for a second combination of attribute comparison outcomes represented by matching conditions of a second rule 212b. An example method for creating a set of deterministic rules 212 is described with reference to FIG. 4 of the disclosure.

In various examples, the rule learner 165 is configured to determine and create deterministic rules 212 that are associated with particular scenarios, such as two people with very similar names and dates of birth who live near each other that are determined to be cousins who are named after a same individual who recently expired; two individuals living in a dense urban area with the same common name, date of birth, and address; or an example of twins having the same or similar first names. Other scenarios are possible and are within the scope of the disclosure. Consider, for example, that twin siblings may have various exact-matching demographic attributes 206, such as matching last names, dates of birth, addresses, phone numbers, insurance information, guarantors, etc., various demographic attributes 206 that are non-matching, such as first names, SSNs, genders, etc., and various demographic attributes that are similar-matching (e.g., attribute comparison scores 207 within a certain range), such as similar first names and SSNs. The specific pattern of matching and non-matching attributes 206 (e.g., non-matching or similar-matching first names 206a, blank or non-matching middle names 206b, matching last names 206c, matching addresses 206d, matching DOBs 206e, and SSNs 206f that are similar-matching) may be specific to twin siblings. Based on analyses of large volumes of training data (historical/empirical data stored in the training data store 170), the rule learner 165 is configured to identify this pattern in a statistically-significant number of historical data records having actual entity resolution results and record link results that specify that the two entities are twin siblings. The rule learner 165 is configured to create a deterministic rule 212 having matching properties that capture a learned pattern of attribute comparison outcomes 208 and the learned actual result. For example, the rule learner 165 may create a deterministic rule 212g having matching conditions (i.e., a specific pattern of attribute comparison outcomes 208) that define a non-match outcome of twin sibling entities.

The rule learner 165 is further configured to assign a justification code to a created deterministic rule 212, wherein the justification code may include a unique identification number specific to that deterministic rule. In example aspects, created deterministic rules 212 along with the assigned justification codes are stored in the rules data store 175. In example aspects, the deterministic rules 212 are ranked and stored in order based on best matching/highest-possible overall similarity scores to lesser-confident matches/lower overall similarity scores. The rules data store 175 is illustrative of a table or database that includes a ranked set of deterministic rules 212a-n (generally 212), that can be accessed by the justification engine 160 to provide justifications 214 for match outcomes 210 based on learned patterns of attribute comparison outcomes 208 and actual results.

According to aspects, the entity resolution system 110 is configured to provide or output match comparison results 216 including a match outcome 210 and a justification 214 for the outcome in a match response 140 to the requestor system 120. An example method for determining the outcome 210 and the justification 214 for the outcome is described with reference to FIG. 3 of the disclosure. For example and with reference to FIG. 2D, based on the comparison 225b of the first data record 202a and the third data record (candidate data record 202c) performed by the matching engine 150, the result of the comparison 225b includes a plurality of attribute comparison outcomes 208b corresponding to the comparisons of the various attributes 206a-f of the data records 202a,c. The justification engine 160 searches the rules data store 175 for a highest ranking rule 212 that matches the attribute comparison outcomes 208b or a subset of the attribute comparison outcomes. In the illustrated example, the justification engine 160 identifies rule G 212g as the highest-ranking deterministic rule that includes a set of matching conditions that the attribute comparison outcomes 208b or a subset of the attribute comparison outcomes satisfies. Accordingly, the justification engine 160 is configured to apply rule G 212g, and the match justification 214b associated with rule G 212g is linked to the match outcome 210b. This comparison results 216b including the match outcome 210*b* and the match justification 214*b* are included in a match response 140 and communicated to the requestor system 120.

Figure 2E:
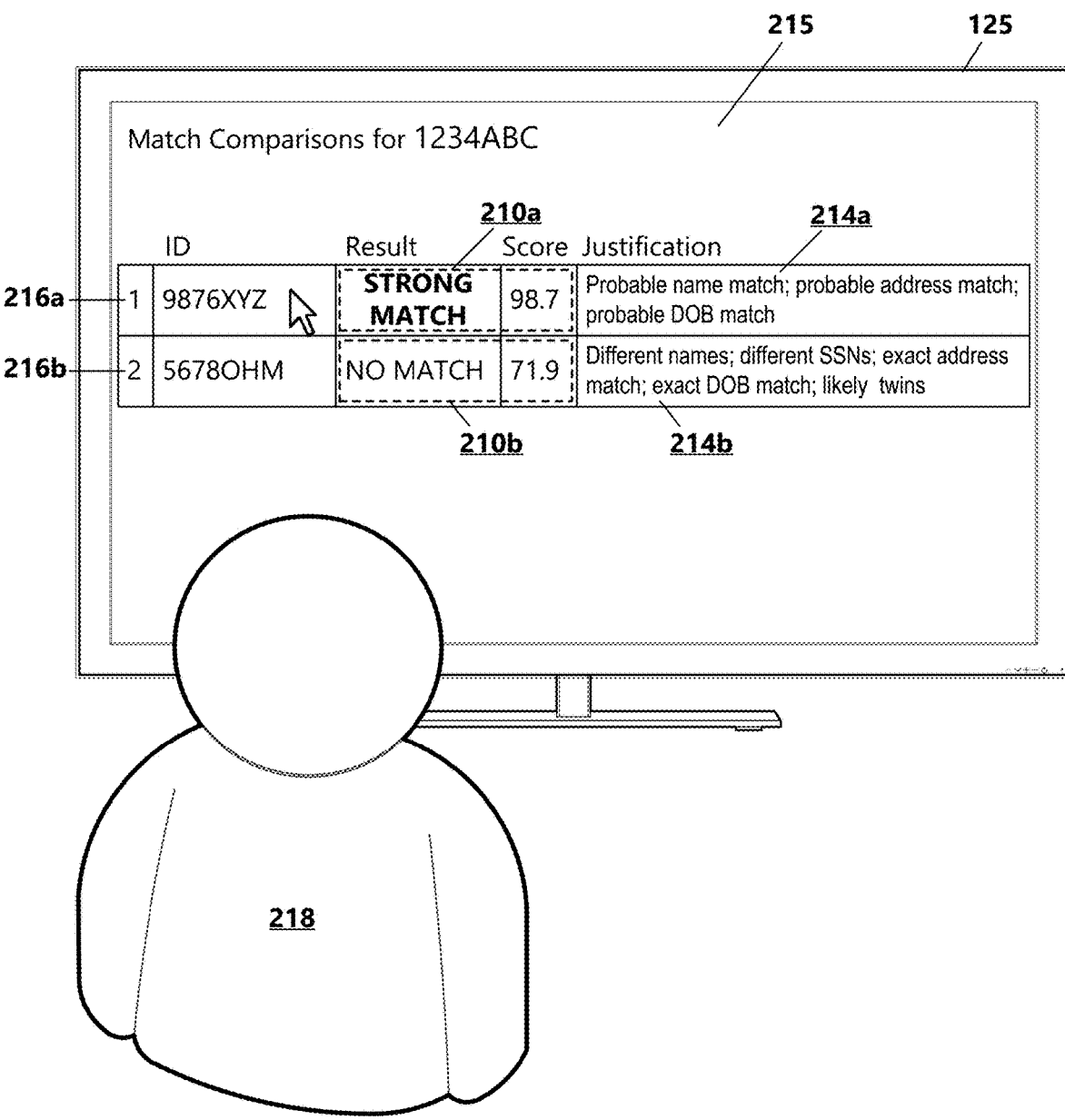
FIG. 2E is an illustration of an example user interface displaying match comparison results including example match justifications.

For example and with reference to FIG. 2E, the match response 140 can be received by a requesting device 125 of the requestor system 120, which is configured to receive the response and display one or more match comparison results 216*a,b*. For example, a user interface (UI) 215 can be generated and displayed on a display of the requesting device 125. The UI can include the match comparison results 216*a,b*, and the results (e.g., the match outcome 210 and the justification 214 for the outcome) can be viewed by the requestor (e.g., an administrative user 218/administrator, an automated review/verification system) and used as part of making a determination as to whether to link two data records 102. For example, the match justification 214 includes information that justifies the match outcome 210 and thus can help increase the efficiency of the above-mentioned review/validation process of the match outcome by providing insights into the match outcome in a human-readable and easily-consumable format. The administrative user 218 can easily and efficiently view the match justification 214 and determine whether the information provided in the match justification meets the requestor's internal criteria for whether a match is good enough. The justification 214 can help the administrative user 218 in that process without the user having to do further analysis to figure out why data records 202 have been determined to match or not match.

For example, the match 1 comparison result 216*a* may include a match outcome 210*a* of a match (and may or may not include an overall match score) and a match justification 214*a*. The example match outcome 210*a* illustrated in FIG. 2E indicates that the compared data records are a "strong match." The example match justification 214*a* for the first match comparison result 216*a* includes a listing of attributes 206 (e.g., demographic fields) that were determined to be probable matches (e.g., not exact matches). For example, the administrative user 218 may use this information to focus his/her review on the attributes 206 that were matched probabilistically to verify that these attributes were matched correctly. As another example, the match 2 comparison result 216*b* may include a match outcome 210*b* of a non-match (and may or may not include an overall match score) and a match justification 214*b*. The example match justification 214*b* for the second match comparison result 216*b* includes a listing of differential attributes, a listing of exact matching attributes, and an indication that the entity associated with the first data record 202*a* and the entity associated with the third data record 202*c* are likely twin siblings. As can be appreciated, the justifications 214*a,b* are examples of justifications for the match outcomes 210*a,b*; more, less, or alternative information can be included. In example aspects, the administrative user 218 may be able to select a match comparison result 216 to view additional justification details.

With reference to FIG. 2F, an example of a UI 215 including justification 214*a* information displayed in a human-readable and easily-consumable format is illustrated. In some examples, the justification information can be provided in response to a selection of the first match comparison results 216 (e.g., displayed in a first UI view). In other examples, match comparison results 216 may be displayed in the example illustrated format, where attributes 206 that are differential, non-exact matching, or inaccurate may be highlighted. Accordingly, the administrative user 218 can quickly and easily ascertain why the particular match outcome 210*a* was made. In some examples and as illustrated, highlighted attributes 220*a,b,c* (e.g., differential, non-exact matching, or inaccurate attributes 206) may be editable in the UI 215. The administrative user 218 may be enabled to select a highlighted attribute 220*a* to correct a typographical, spelling, or other error. For example, the data records 202*a,b* are determined to match, which means that the demographic details of the two records should be exact matches. However, as illustrated, the first name demographic fields, DOB fields, and street address fields are not exact matches, and may need to be resolved. As illustrated, the administrative user 218 selects the highlighted first name attribute 220*a*, and responsive to the selection and as illustrated in FIG. 2G, the UI 215 can be updated to display justification details 222 associated with the probable match of the first name demographic fields. The administrative user 218 may be able to use the UI 215 to easily view the mismatched information for determining which attribute 206 is correct, to edit the attribute, or to reject the attribute comparison outcome 208 (e.g., probable match of the first name attribute 206*a*).

FIG. 2H includes an example illustration of another UI 215 including a match justification 214*b* for the second match comparison 225*b* displayed in a human-readable and easily-consumable format. For example, the match justification 214*b* may include a listing of the matching conditions of an applied deterministic rule 212*g* that are met. For example, when a particular rule 212*g* is applied to a match outcome 210*b*, the matching conditions of the match comparison 225*b* that satisfy the rule 212*g* (e.g., certain matching demographic fields, certain non-matching demographic fields) may be included in the justification 214*b*. FIG. 2I shows another example UI 215, where the UI is updated to include a highlighted attribute 220*d* associated with matching SSN demographic fields. For example, based on the match outcome 210*b* of a non-match, the SSN fields should not match; however, they do. Accordingly, the demographic attribute fields 206*f* may be highlighted for informing the administrative user 218 of attributes 206 that may need to be resolved. In various examples, the requestor can utilize match justifications 214 as part of developing policies that ensure that key demographic data (e.g., that are associated with accurate record links) are collected at the initial point of capture and are collected accurately for improving data record 202 linkage results.

Figure 3:
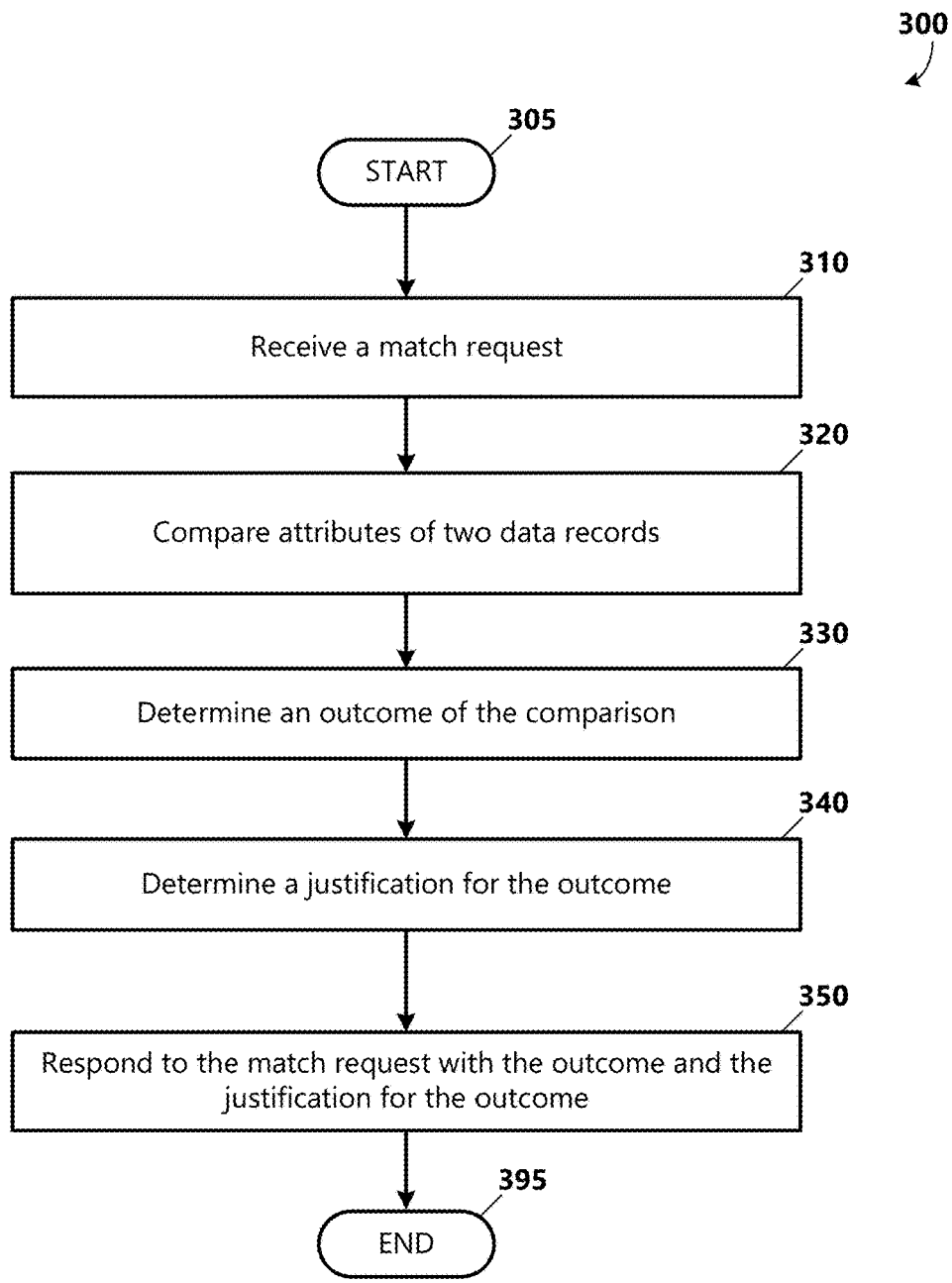
FIG. 3 is a flow chart showing general stages involved in an example method for determining and providing a match justification.

FIG. 3 is a flow chart showing general stages involved in an example method 300 for determining an outcome 210 and a justification 214 of a match request 130. In example aspects, the method 300 may be implemented in the example operating environment 100. In other example aspects, the method 300 may include instructions which are stored in a memory executed by a processing device of a computing system as described with respect to FIG. 6.

The method 300 begins at START OPERATION 305. At OPERATION 310, a request to determine a match (i.e., match request 130) is received. For example, the match request 130 may be sent by a requestor system 120 and received by the entity resolution system 110 and may include a request to determine a match between a first data record 202*a* and one or more candidate data records 202*b-n*. According to one example, the match request 130 may include a request to determine an association between at least two data records 202 included in the request. That is, the match request 130 may be received to determine whether two records are associated with a single entity, two different entities, or two different but related entities. According to another example, the match request 130 may include a request to determine one or more additional data records 202 associated with an entity associated with a data record 202*a* included in the request. For example, the match request 130 may be received to determine data records 202*b-n* stored in one or more databases 180 that are associated with the entity in the included data record 202*a*. According to another example, the match request 130 may include a request to determine an entity associated with a data record 202*a*. Other example match requests 130 are possible and are within the scope of the present disclosure.

The match request 130 may be created in response to a creation of a new data record 202, when merging one set of data records with another set of data records, when retrieving/receiving a new data record, as part of a review to merge duplicate data records or to identify erroneously-overlaid data records, when a data record is modified, etc. In some examples, a match request 130 includes a request to match or resolve a single data record 202 pair. In other examples, a match request 130 includes a batch of data record 202 pairs to match or resolve. As described above, a data record 202 includes attributes 206 (e.g., demographic details) of an entity. For example, an administrative user 218 may input various demographic details of a patient into a requestor system 120 of a healthcare provider system via a requesting computing device 125 to create a new data record 202.

After receiving the match request 130, at OPERATION 320, the method 300 uses the matching engine 150 to compare various attributes 206 of at least two data records 202. According to some example aspects, attribute 206 data associated with one or more data records 202 associated with the match request 130 are extracted. The attribute 206 data may include a first name, a middle name, a last name, a date of birth, an address, a social security number, etc. In some aspects, the demographic fields data corresponding only to preselected attributes 206 are extracted from the data records 202. The attributes 206 that are extracted may be configurable. For example, a particular requestor may determine that a first name, a last name, a date of birth, and an address provides a fairly accurate way to identify a user's record, and that requestor determine to include a first name, a last name, a date of birth, and address in a user intake form. In example aspects, the attributes 206 used for matching are based on ease of collecting the data for that attribute and ease of performing comparison for the attribute data. In some aspects, the attributes 206 are updated based on the outcome 210 of the match comparison 225. For example, a demographic field may be added or removed based on a contribution of the demographic field data in accuracy of the match outcome. That is, a particular demographic field may be added to increase the accuracy of the outcome. More, fewer, or other types of attributes 206 are possible and are within the scope of the present disclosure. In some aspects, the attribute fields 206 to be compared are determined empirically and/or heuristically. For example, if comparison of a particular attribute field 206 increases the accuracy of the match outcome 210, then that particular attribute is included.

After extracting the attribute fields 206 data, the data are compared. For example, a first plurality of demographic fields data associated with the first data record 202*a* is compared with a second plurality of demographic fields data associated with a second data record 202*b*. In some examples, the first plurality of demographic fields data is compared with demographic fields data corresponding to each of a plurality of records or entities stored in a database 180. In example aspects, a one-to-one comparison is performed for the attribute fields 206 data. For example, a first name field data for a first data record 202*a* is compared with a first name field data of a second data record 202*b*. In one example, the one-to-one comparison is performed for all the demographic fields data extracted from the request. In other aspects, the one-to-one comparison is made only for a preselected set of demographic fields data. For example, the one-to-one comparison is made for first name field data, last name field data, date of birth field data, and address field data. As described above, in example aspects, the comparison can use probabilistic matching techniques, which leverage statistical theory and data analysis. As can be appreciated, probabilistic matching techniques can establish more accurate links between records with more complex typographical errors and error patterns than less-complex systems. Probabilistic entity resolution systems are enabled to pinpoint variation and nuances to a fine degree, and are typically implemented by enterprises that have complex data systems with multiple databases. Due to the size of these data systems, the potential for duplicates, human error, and discrepancies is far greater, making a probabilistic entity resolution system designed to determine links between records with complex error patterns more effective (e.g., speed and accuracy). For example, the probabilistic matching techniques used by the matching engine 150 are attuned for situations where data set sizes and numbers of attributes may be large and where accuracy may be costly to an organization in terms of risks or consequences.

During the comparison, a level of match (e.g., attribute comparison score 207) is determined between two attributes fields 206 data as described above, and an outcome of the match (attribute comparison outcome 208) is provided based on the level of match. In one example aspect, the attribute comparison outcome 208 of the comparison is provided in a binary form (attribute comparison result 209). For example, if the level of match between demographic field data is above a predetermined threshold, then the outcome 208 of the comparison of the demographic field data is provided as a "match" attribute comparison result 209. Similarly, if the level of match between demographic field data is below the predetermined threshold, then the outcome of the comparison of the demographic field data is provided as a "non-match" attribute comparison result 209.

In some aspects, the outcome of the comparison is provided as a similarity score (attribute comparison score 207) on a preselected scale based on the level of the match. For example, the outcome 208 of the comparison may be provided as an attribute comparison score 207 between minus one and plus one (−1 to +1), where minus one is assigned for no match and plus one is assigned for an exact match. In various examples, a predetermined attribute comparison score 207 is assigned for a comparison involving one or more missing attribute fields 206 data.

After comparing the attribute fields 206 data at OPERATION 320, at OPERATION 330, the method 300 uses the matching engine 150 to determine an overall outcome 210 of the comparison. An example match outcome 210 includes that two data records 202 match and are associated with a single entity. Another example match outcome 210 includes that two data records 202 do not match and are not associated with a single entity.

In one aspect, the outcome 210 of the comparison 225 is determined by aggregating outcomes of the one to one comparisons of each of the attribute fields 206 data. For example, the match outcome 210 may be determined by aggregating the attribute comparison scores 207 for each compared attribute field 206. In other aspects, the outcome of the comparison is determined by aggregating outcomes of comparisons of preselected attribute fields data. The aggregation can be a simple aggregation or a weighted aggregation. In a weighted aggregation, an attribute field 206 may be assigned a predetermined weight. The assigned weight is multiplied with the attribute comparison score 207 of the corresponding attribute field 206. The weighted attribute comparison scores 207 are aggregated and compared against a threshold to determine the match outcome 210 of the comparison 225.

At OPERATION 340, the method 300 uses the justification engine 160 to determine a justification 214 for the match outcome 210, wherein the justification is determined from a plurality of deterministic rules 212. For example, an applicable deterministic rule 212 matching with the outcome 210 of the comparison for the attribute fields 206 data is determined from the plurality of deterministic rules. In one aspect, the applicable deterministic rule 212 is determined based on a pattern of outcomes (attribute comparison outcomes 208) of the comparison of the attribute fields 206 data. For example, the applicable deterministic rule 212 may be determined based on an identified pattern of matching, no-matching, and missing demographic fields data determined during the comparison. In example aspects, the deterministic rules 212 may be applied in order to the attribute comparison outcomes 208 for identifying whether the attribute comparison outcomes satisfy the matching conditions of a rule (e.g., an exact matching last name attribute field, a first name attribute field match of at least 0.95, a DOB attribute field match of at least 0.85, . . . ). According to an aspect, the rules 212 are applied in order from the highest ranked rule to the lowest until a matching rule is identified. After determining the applicable deterministic rule, a justification 214 associated with the applicable deterministic rule 212 is determined and linked to the match outcome 210. A method of creating deterministic rules 212 with justifications 214 is discussed with reference to FIG. 4, and an example table of deterministic rules 212 is described with reference to FIG. 5B.

At OPERATION 350, the method 300 uses the entity resolution system 110 to provide match comparison results 216 to the requestor system 120. For example, the match outcome 210 and the match justification 214 are included in a match response 140 responsive to the match request 130. In some examples, the justification 214 is provided as a justification code. In some aspects, the match response 140 includes a list of data records 202 or entities searched in a database 180 with demographic fields data matching with the demographic fields data of the match request 130 or of a data record 202 included in the request. The list of data records 202 or entities may be filtered and sorted in decreasing order of the level of match. An administrative user 218 of the requestor system 120 can use the match outcome 210 and justification 214 as part of a verification process for making a final determination as to whether or not to link two data records 202 compared by the entity resolution system 110. According to aspects, the justification can increase the efficiency of the verification by providing these matching insights in a consolidated manner and in a prompt response (e.g., can be delivered via batch or via an API call). The method 300 ends at OPERATION 395.

Figure 4:
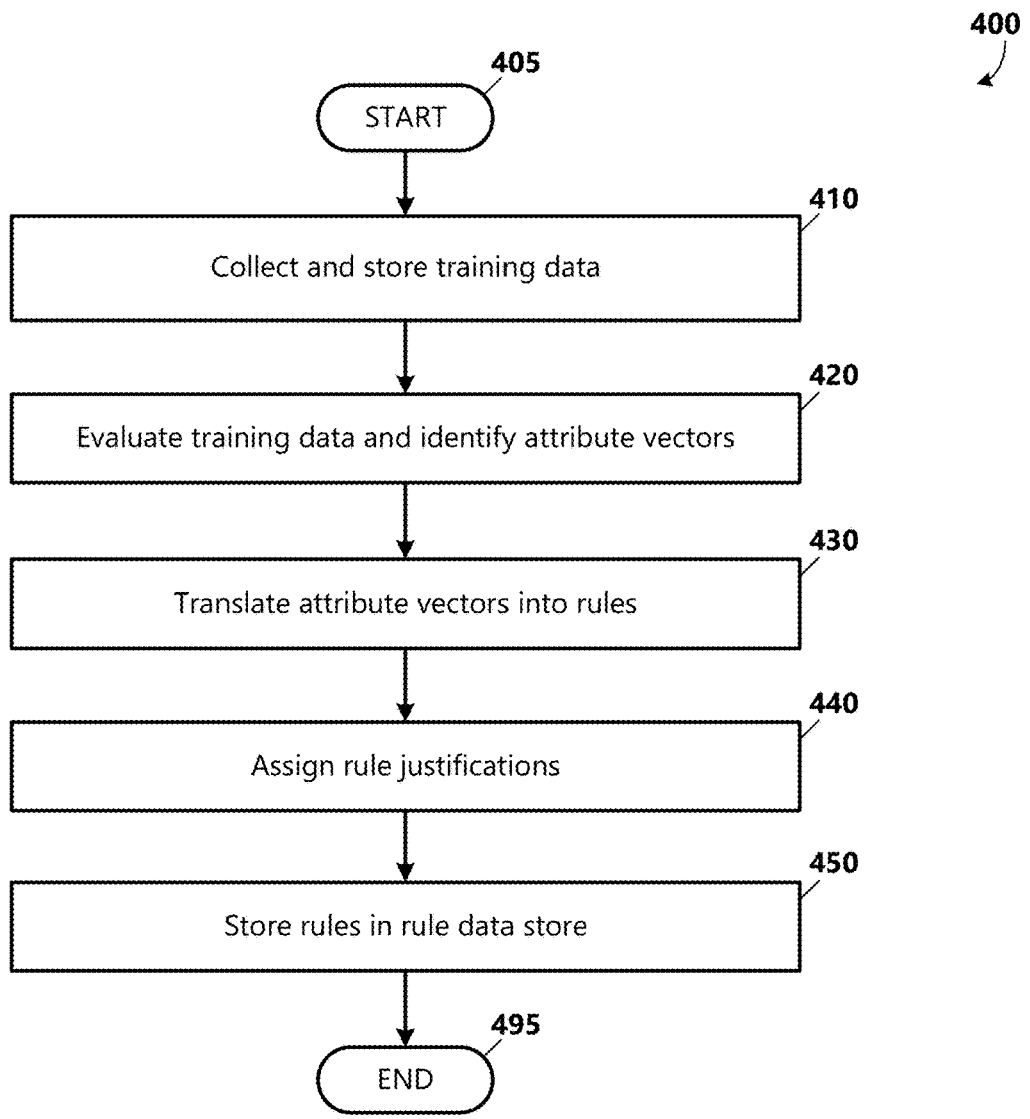
FIG. 4 is a flow chart showing general stages involved in an example method for creating deterministic rules.

FIG. 4 is a flow chart showing general stages involved in an example method 400 for creating deterministic rules 212. As described above, the deterministic rules 212 are created to determine a justification 214 for an outcome 210 of a match request 130. In example aspects, the deterministic rules 212 are created before initiating method 300 for determining the match outcome 210. In one aspect, the deterministic rules 212 are created based on empirical or a heuristic method. In another aspect, some deterministic rules 212 may be created manually.

The method 400 begins at START OPERATION 405 and proceeds to OPERATION 410, where training data are collected and stored in a training data store 170. In example aspects, the training data include data used to train machine learning algorithms and to increase the accuracy of the algorithms. In various examples, the training data include historical data collected from past match comparisons 225 and decisions (e.g., attribute comparison outcomes 208 and match outcomes 210) made by the matching engine 150. These results may be verified results. For example, the training data can include positive examples that indicate when a desired result has been achieved (e.g., when two data records 202*a,b* are determined to match and the entity associated with each record are the same individual and when two data records are determined to not match and the entities associated with the two records are not the same individual).

At OPERATION 420, the method 400 uses the rule learner 165 to learn features that identify matching data records 202 and particular justifications 214 for the matches and to learn features that identify non-matching data records 202 and particular justifications 214 for the non-matches. In example aspects, the rule learner 165 assigns data record pairs 202; of the training data to a matched dataset or a non-matched dataset, and evaluates each dataset based on the attribute comparison outcomes 208 for identifying patterns in the data that can be used to determine the correct output value (e.g., matches and non-matches) for new data instances. According to an aspect and with reference to FIG. 5A, the rule learner 165 converts each attribute comparison score 207 of each data record pair 202; to an attribute vector 502 within an attribute matrix. In some examples, an attribute comparison score 207 is translated exactly into a value in the attribute vector 502 (e.g., an attribute comparison score of 0.5 is translated to a 0.5 in the attribute vector; an attribute comparison of 678 is translated to a 678 in the attribute vector). In some examples, an attribute comparison score 207 is compared against a preset threshold value, and if the attribute comparison score satisfies the threshold value, the attribute comparison score is translated to a preset value in the attribute vector 502 (e.g., an attribute comparison score of 0.96 is translated to a 1.0 based on a threshold value of 0.95). In some examples, an attribute comparison result 209 (e.g., match, non-match, blank) is translated into a preset value (e.g., a match=1, a non-match=0, a blank=0). In some examples, an attribute vector 502 includes a range of values that correspond to a range of attribute comparison scores 207 (e.g., −1.0-0.3; 0.9-1.0; 675-1000).

As an example, an attribute vector 502*a* for a first data record pair 202$_{ab}$ with eleven out of eleven exact-matching attributes 206 may be represented as: $v_{a,b}$=[1, 1, 1, 1, 1, 1, 1, 1, 1, 1, 1]. As should be appreciated, the attributes (e.g., type and number) that are compared may be predetermined and may be configurable. As another example, an attribute vector 502*b* for a data record pair 202$_{cd}$ with all exact-matching attributes 206*a-k*, except a blank second attribute 206*b* may be represented as: $v_{a,b}$=[1, -, 1, 1, 1, 1, 1, 1, 1, 1, 1]. As another example, an attribute vector 502*c* for a data record pair 202$_{ef}$ with exact-matching first and second attributes 206*a,b*, similar-matching (based on a preset threshold) second and third attributes 206*c,d*, and non-matching fourth through eleventh attributes 206*e-k* may be represented as: $v_{a,b}$=[1, 1, 0.90, 0.85, 0, 0, 0, 0, 0, 0, 0]. According to an aspect, the rule learner 165 generates a set of vector patterns or attribute vectors 502 (i.e., an attribute matrix) for each matched dataset and non-matched dataset and their respective frequency counts (e.g., a number of times a particular attribute vector occurs in a dataset). The attribute vectors 502 hold information about which combinations of attributes 206 appear the most frequently as matching and non-matching pairs. By comparing the frequency counts of the attribute vectors, the rule learner 165 is able to determine which combination of attributes (a rule) that allows to detect more duplicates/matches without sacrificing on precision.

At OPERATION 430, the method 400 uses the rule learner 165 to translate the attribute vectors 502 into deterministic rules 212. For example and with reference to FIG. 5B, the rule learner 165 may create a first deterministic rule 212a based on the first attribute vector 502a, wherein the rule matching conditions 504a of the first rule are representative of the attribute comparison outcomes 208 associated with the data record pairs 202; on which the first attribute vector 502a is based. For example, example rule matching conditions 504a of the first deterministic rule 212a may include: (exact_firstname && exact_middlename && exact_lastname && exact_streetaddress && exact_city && exact_state && exact_zip && exact_DOB && exact_SSN && exact_phone && exact_clientID). For example, the rule learner 165 creates the first rule 212a based on the first attribute vector 502a, wherein the first rule is associated with the best matching scenario where the attribute data corresponding to each attribute field 206 are exact matches.

In creating each deterministic rule 212, the rule learner 165 further creates a rule action 506 for the rule. For example, the rule action 506 is the action that the justification engine 160 is configured to perform when the matching conditions 504 of the rule 212 are satisfied. In example aspects, the rule action 506 defines a message to include in a match response 140 for a match comparison 225, wherein the message includes a particular justification 214 for the match. According to an aspect, the justification 214 that is assigned to a rule 212 may correspond to one or a combination of: matching attributes 206, non-matching attributes, missing attributes, particular scenarios (e.g., such as two people with very similar names and dates of birth who live near each other that are determined to be cousins who are named after a same individual who recently expired; two individuals living in a dense urban area with the same common name, date of birth, and address; twins having the same or similar first names), etc. In some examples, the rule learner 165 automatically defines the justification 214. For example, the rule leaner 165 may include a human-readable listing of one or more of the rule matching conditions 504 of a rule 212 as the justification 214 for the rule. In other examples, the rule learner 165 receives an input of a justification 214 for the rules 212. An example rule action 506 may include: in the 'match response', include the message "all attributes match".

In some examples, the rule learner 165 further assigns an expected match result 508 to each rule 212. According to an aspect, the expected match result 508 that is assigned to a rule 212 may correspond to the dataset (i.e., matched dataset or non-matched dataset) from which the attribute vector 502 is identified. For example, a rule 212 created from an attribute vector 502 identified in the matched dataset may have an expected match result 508 of a match; and a rule created from an attribute vector identified in the non-matched dataset may have an expected match result of a non-match. The expected match result 508 can be compared against the match outcome 210 of a match as a verification step for the match comparison 225. For example, the verification step can include a comparison of a probabilistic match outcome 210 (e.g., match or non-match) against the deterministic outcome (i.e., expected match result 508). In some examples, the expected match result 508 and the match outcome 210 are compared by the justification engine 160 as part of OPERATION 340 of method 300. For example, the justification 214 is applied if the expected match result and the match outcome match. In other examples, the expected match result 508 and the match outcome 210 may be compared by an administrative user 218 as part of a verification process.

At OPERATION 450, the rules 212 are stored in the rules data store 175, where they can be accessed by the justification engine 160 for determining justifications 214 for match outcomes 210. In example aspects, each rule is assigned a unique rule identifier. The method 400 ends at OPERATION 495.

Figure 6:
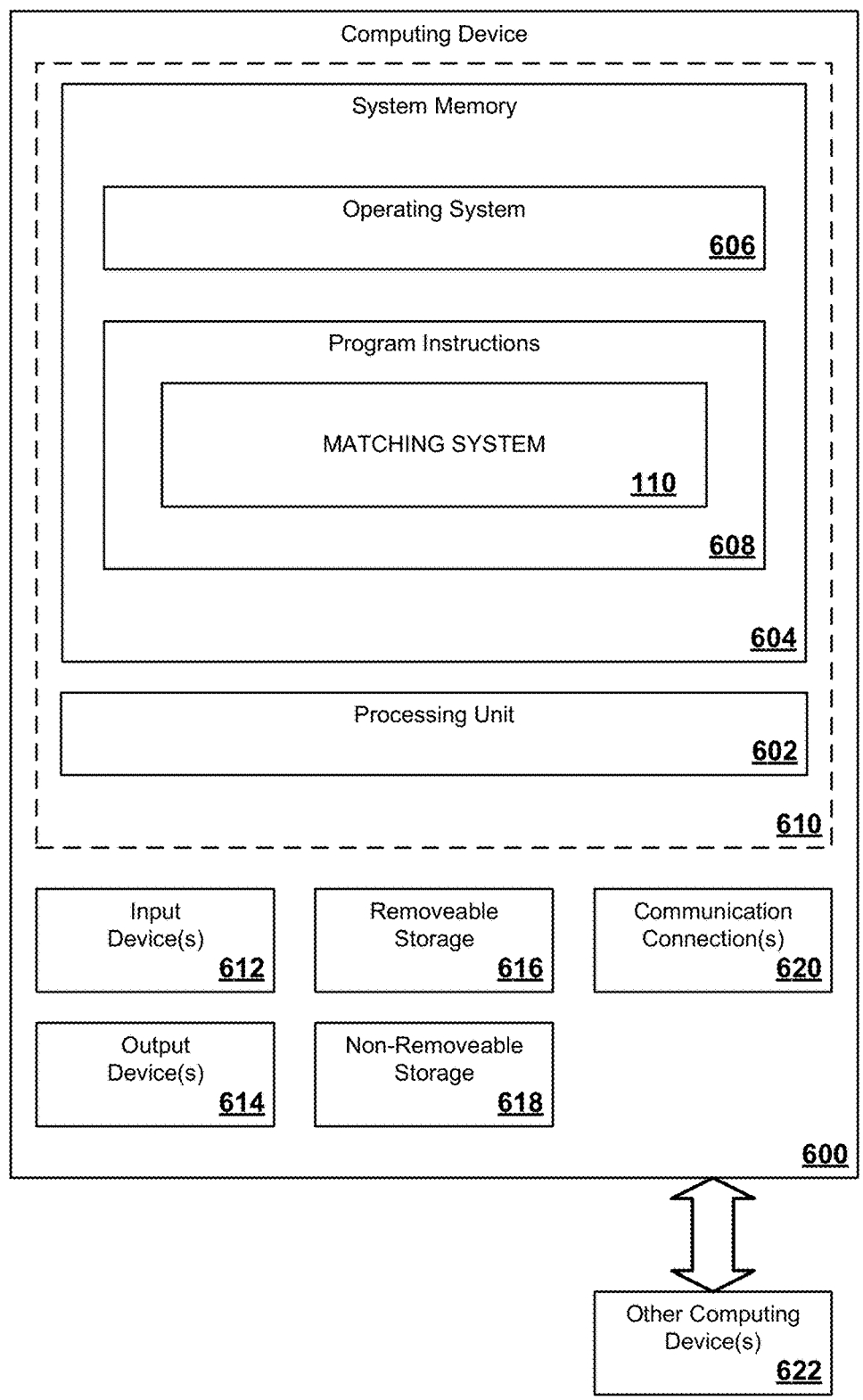
FIG. 6 is a block diagram illustrating example physical components of a computing device with which aspects of the system may be practiced.

FIG. 6 is a block diagram illustrating physical components of an example computing device with which aspects may be practiced. Computing device 600 may include at least one processing unit 602 and a system memory 604. The system memory 604 may include, but is not limited to, volatile (e.g. random access memory (RAM)), non-volatile (e.g. read-only memory (ROM)), flash memory, or any combination thereof. The system memory 604 may include an operating system 606, one or more program instructions 608, including instructions operable by the entity resolution system 110, and may include sufficient computer-executable instructions for the entity resolution system, which when executed, perform functionalities as described herein. Operating system 606, for example, may be suitable for controlling the operation of computing device 600. Furthermore, aspects may be practiced in conjunction with a graphics library, other operating systems, or any other application program and is not limited to any particular application or system. This basic configuration is illustrated by those components within a dashed line 610. Computing device 600 may also include one or more input device(s) 612 (keyboard, mouse, pen, touch input device, etc.) and one or more outcome device(s) 614 (e.g., display, speakers, a printer, etc.).

Computing device 600 may also include additional data storage devices (removable or non-removable) such as, for example, magnetic disks, optical disks, or tape. Such additional storage is illustrated by a removable storage 616 and a non-removable storage 618. Computing device 600 may also contain a communication connection 620 that may allow the computing device 600 to communicate with other computing devices 622, such as over a network in a distributed computing environment, for example, an intranet or the Internet. Communication connection 620 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit including discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present disclosure may be used in various distributed computing environments where tasks are performed by remote processing devices that are linked through a communications network.

Aspects of the disclosure may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 600 or any other computing devices 622, in combination with computing device 600, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this disclosure are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The disclosure should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A system for providing match justifications for data record match outcomes, the system comprising:
a processor; and
a memory storage device including instructions that when executed by the processor are configured to:
receive a request from a requestor system to determine a match between a first data record and a plurality of data records;
compare attributes associated with the first data record with corresponding attributes associated with the plurality of data records;
generate an attribute comparison outcome for the comparison of each attribute for each of the plurality of data records;
determine a match outcome based on the attribute comparison outcomes for each of the plurality of data records, wherein the match outcome indicates whether the first data record matches a given data record of the plurality of data records;
based at least in part on the match outcome associated with the plurality of data records, identify a subset of the plurality of data records and sort the subset of the plurality of data records in a decreasing order or an increasing order based on a level of match associated with attribute comparison outcomes;
evaluate the attribute comparison outcomes of the subset of the plurality of data records against a set of deterministic rules for determining a justification for the match outcome of each data record of the subset of the plurality of data records, wherein the justification comprises a justification code comprising a unique identification indicator specific to a relevant deterministic rule used for the match outcome; and
respond to the match request with a match response including the match outcome and the justification for the match outcome.

2. The system of claim 1, wherein the justification comprises at least one of:
matching attributes;
differential attributes; or
predetermined scenarios corresponding to the attribute comparison outcomes.

3. The system of claim 1, wherein:
the set of deterministic rules comprises a plurality of deterministic rules; and
each deterministic rule comprises a set of matching conditions and a rule action that is executed when the set of matching conditions is satisfied.

4. The system of claim 3, wherein in evaluating the attribute comparison outcomes against the set of deterministic rules for determining the justification, the system is configured to:
- determine whether the attribute comparison outcomes satisfy the set of matching conditions associated with a given deterministic rule of the set of deterministic rules; and
- when the attribute comparison outcomes satisfy the set of matching conditions associated with the given deterministic rule:
  - evaluate the given deterministic rule as true; and
  - perform an action associated with the given deterministic rule, wherein the action is defined by an action instruction to associate a particular justification with the match outcome.

5. The system of claim 3, wherein the system is further configured to create the set of deterministic rules prior to receiving the request.

6. The system of claim 5, wherein in creating the set of deterministic rules, the system is configured to:
- evaluate a set of training data comprising a plurality of data record pairs, wherein each of the plurality of data record pairs is classified as a match or as a non-match, and wherein each of the plurality of data record pairs comprises a plurality of attribute comparison outcomes based on a comparison of each attribute of each data record pair;
- identify a first vector pattern associated with the attribute comparison outcomes of a plurality of data record pairs classified as matches;
- translate the first vector pattern into a set of matching conditions for a first deterministic rule;
- assign a rule action to the first deterministic rule, wherein the rule action comprises an action instruction to associate a particular justification corresponding to the first vector pattern to a match outcome of a match comparison when the set of matching conditions for the rule is satisfied; and
- store the first deterministic rule in a rules data store.

7. The system of claim 6, wherein the first vector pattern is a vector pattern associated with a highest frequency of vector patterns identified in the plurality of data record pairs classified as matches.

8. The system of claim 6, wherein the particular justification includes a human-readable message indicating that all attributes match.

9. The system of claim 6, wherein in creating the set of deterministic rules, the system is further configured to:
- identify a second vector pattern associated with the attribute comparison outcomes of the plurality of data record pairs classified as matches, wherein the second vector pattern is associated with a second-highest frequency of vector patterns identified in the plurality of data record pairs classified as matches;
- translate the second vector pattern into a set of matching conditions for a second deterministic rule;
- assign a rule action to the second deterministic rule; and
- store the second deterministic rule in a rules data store.

10. The system of claim 9, wherein in creating the set of deterministic rules, the system is further configured to:
- identify a third vector pattern associated with the attribute comparison outcomes of a plurality of data record pair classified as non-matches;
- translate the third vector pattern into a set of matching conditions for a third deterministic rule;
- assign a rule action to the third deterministic rule, wherein the rule action includes an action instruction to associate a particular justification corresponding to the third vector pattern to a match outcome of a match comparison when the set of matching conditions for the rule is satisfied; and
- store the third deterministic rule in the rules data store.

11. A method for providing match justifications for data record match outcomes, comprising:
- receiving a request from a requestor system to determine a match between a first data record and a plurality of data records;
- comparing attributes associated with the first data record with corresponding attributes associated with the plurality of data records;
- generating an attribute comparison outcome for the comparison of each attribute for each of the plurality of data records;
- determining a match outcome based on the attribute comparison outcomes for each of the plurality of data records, wherein the match outcome indicates whether the first data record matches a given data record of the plurality of data records;
- based at least in part on the match outcome associated with the plurality of data records, identifying a subset of the plurality of data records and sort the subset of the plurality of data records in a decreasing order or an increasing order based on a level of match associated with attribute comparison outcomes;
- evaluating the attribute comparison outcomes of the subset of the plurality of data records against a set of deterministic rules for determining a justification for the match outcome of each data record of the subset of the plurality of data records, wherein the justification comprises a justification code comprising a unique identification indicator specific to a relevant deterministic rule used for the match outcome; and
- responding to the match request with a match response including the match outcome and the justification for the match outcome.

12. The method of claim 11, wherein the justification comprises at least one of:
- matching attributes;
- differential attributes; or
- predetermined scenarios corresponding to the attribute comparison outcomes.

13. The method of claim 11, wherein evaluating the attribute comparison outcomes against a set of deterministic rules for determining the justification for the match outcome comprises:
- determining whether the attribute comparison outcomes satisfy a set of matching conditions associated with a given deterministic rule of the set of deterministic rules; and
- when the attribute comparison outcomes satisfy the set of matching conditions associated with the given deterministic rule:
  - evaluate the given deterministic rule as true; and
  - perform an action associated with the given deterministic rule, wherein the action is defined by an action instruction to associate a particular justification with the match outcome when the set of matching conditions is satisfied.

14. The method of claim 11, further comprising creating the set of deterministic rules prior to receiving the match request, wherein creating the set of deterministic rules comprises:

evaluating a set of training data comprising a plurality of data record pairs, wherein each of the plurality of data record pairs includes a plurality of attribute comparison outcomes based on a comparison of each attribute of the data record pair;

identifying a first vector pattern associated with the attribute comparison outcomes of the plurality of data record pairs;

translating the first vector pattern into a set of matching conditions for a first deterministic rule;

assigning a rule action to the first deterministic rule, wherein the rule action comprises an action instruction to associate a particular justification corresponding to the first vector pattern to a match outcome of a match comparison when the set of matching conditions for the rule is satisfied; and storing the first deterministic rule in a rules data store.

15. The method of claim 14, wherein:

identifying the first vector pattern comprises identifying a most frequently-occurring vector pattern identified in the plurality of data record pairs; and assigning the rule action to the first deterministic rule comprises assigning an action instruction to associate the particular justification indicating that all attributes match.

16. The method of claim 14, further comprising:

identifying a second vector pattern associated with the attribute comparison outcomes of the plurality of data record pairs, wherein the second vector pattern is a second-most frequently-occurring vector pattern identified in the plurality of data record pairs;

translating the second vector pattern into a set of matching conditions for a second deterministic rule;

assigning a rule action to the second deterministic rule, wherein the rule action includes an action instruction to associate a particular justification corresponding to the second vector pattern to a match outcome of a match comparison when the set of matching conditions for the rule is satisfied; and storing the second deterministic rule in a rules data store.

17. The method of claim 11, wherein:

comparing attributes associated with the first data record with attributes associated with each data record of the plurality of data records comprises performing a one to one comparison of each of the attributes;

generating the attribute comparison outcome for the comparison of each attribute comprises determining a similarity score for each of the one to one comparisons; and determining the match outcome based at least in part on the attribute comparison outcomes comprises:

aggregating the similarity scores;

comparing an aggregated similarity score against a preset threshold value; and in response to determining that the aggregated similarity score satisfies the preset threshold value, determining the match outcome for the comparison is a match.

18. A computer readable storage device including computer readable instructions, which when executed by a processing unit are configured to:

receive a request from a requestor system to determine a match between a first data record and a plurality of data records;

compare attributes associated with the first data record with corresponding attributes associated with the plurality of data records;

generate an attribute comparison outcome for the comparison of each attribute for each of the plurality of data records;

determine a match outcome based on the attribute comparison outcomes for each of the plurality of data records, wherein the match outcome indicates whether the first data record matches a given data record of the plurality of data records;

based at least in part on the match outcome associated with the plurality of data records, identify a subset of the plurality of data records and sort the subset of the plurality of data records in a decreasing order or an increasing order based on a level of match associated with attribute comparison outcomes;

evaluate the attribute comparison outcomes of the subset of the plurality of data records against a set of deterministic rules for determining whether the attribute comparison outcomes satisfy a set of matching conditions associated with a rule of the set of deterministic rules; and when the attribute comparison outcomes satisfy the set of matching conditions associated with a rule:

evaluate the rule as true; and perform an action of the rule, wherein the action is defined by an action instruction to associate a justification with the match outcome of each data record of the subset of the plurality of data records when the set of matching conditions is satisfied, wherein the justification comprises a justification code comprising a unique identification indicator specific to a relevant deterministic rule used for the match outcome; and respond to the match request with a match response including the match outcome and the justification for the match outcome.

19. The computer readable storage device of claim 18, wherein the justification comprises at least one of:

matching attributes;

differential attributes; or predetermined scenarios corresponding to the attribute comparison outcomes.

20. The computer readable storage device of claim 18, wherein the computer readable instructions are further configured to create the set of deterministic rules prior to receiving the match request, wherein creating the set of deterministic rules comprises:

evaluating a set of training data comprising a plurality of data record pairs, wherein each of the plurality of data record pairs comprises a plurality of attribute comparison outcomes based on a comparison of each attribute of the data record pair;

identifying a first vector pattern associated with the attribute comparison outcomes of the plurality of data record pairs, wherein the first vector pattern is a most frequently-occurring vector pattern identified in the plurality of data record pairs;

translating the first vector pattern into a set of matching conditions for a first deterministic rule;

assigning a rule action to the first deterministic rule, wherein the rule action comprises an action instruction to associate a particular justification corresponding to the first vector pattern to a match outcome of a match comparison when the set of matching conditions for the rule is satisfied;

identifying other vector patterns associated with the attribute comparison outcomes of the plurality of data record pairs, wherein the other vector patterns are different from the first vector pattern;

translating the other vector patterns into sets of matching conditions for additional deterministic rules;

assigning rule actions to the additional deterministic rules, wherein the rule actions comprise action instructions to associate particular justifications to match outcomes of match comparisons when the matching conditions for the rules are satisfied; and storing the first and additional deterministic rules in a rules data store.

* * * * *